(12) United States Patent
Kaushik

(10) Patent No.: US 12,598,104 B1
(45) Date of Patent: Apr. 7, 2026

(54) REDUNDANT AUTOMOTIVE ETHERNET

(71) Applicant: Infineon Technologies Americas Corp., El Segundo, CA (US)

(72) Inventor: Ritwick Kaushik, Mumbai (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 288 days.

(21) Appl. No.: 18/238,913

(22) Filed: Aug. 28, 2023

Related U.S. Application Data

(60) Provisional application No. 63/401,561, filed on Aug. 26, 2022.

(51) Int. Cl.
| | |
|---|---|
| *H04L 41/0663* | (2022.01) |
| *H04L 9/40* | (2022.01) |
| H04L 67/12 | (2022.01) |

(52) U.S. Cl.
CPC ...... *H04L 41/0663* (2013.01); *H04L 63/0227* (2013.01); *H04L 63/10* (2013.01); *H04L 67/12* (2013.01)

(58) Field of Classification Search
CPC . H04L 41/0663; H04L 63/0227; H04L 63/10; H04L 67/12
USPC .......................................... 370/216, 401, 389
See application file for complete search history.

(56) References Cited

U.S. PATENT DOCUMENTS

| | | | | |
|---|---|---|---|---|
| 8,705,527 B1 * | 4/2014 | Addepalli | ............. | H04W 72/20 |
| | | | | 370/389 |
| 9,716,529 B1 | 7/2017 | Dai | | |

| | | | | |
|---|---|---|---|---|
| 10,623,290 B2 * | 4/2020 | Kniplitsch | ............ | H04L 9/3226 |
| 11,153,063 B2 | 10/2021 | Wu | | |
| 2016/0016523 A1 * | 1/2016 | Yousefi | ................. | H04W 72/56 |
| | | | | 370/401 |
| 2019/0394277 A1 * | 12/2019 | Go | ........................... | H04L 12/66 |
| 2020/0240195 A1 * | 7/2020 | Anzai | ................... | H04L 67/125 |
| 2020/0304335 A1 * | 9/2020 | Yanagida | ............... | H04B 10/25 |

(Continued)

OTHER PUBLICATIONS

"IEEE Std 802.3chTM-2020, Amendment 8: Physical Layer Specifications and Management Parameters for 2.5 Gb/s, 5 Gb/s, and 10 Gb/s Automotive Electrical Ethernet," The Institute for Electrical and Electronics Engineers (IEEE), Jun. 4, 2020 (207 pages).

*Primary Examiner* — Jungwon Chang

(57) ABSTRACT

A vehicular communication system includes multiple vehicle subsystem assemblies, each including at least a first Ethernet network interface and a second Ethernet network interface. A first Ethernet switch is communicatively coupled to the first Ethernet network interfaces of the multiple vehicle subsystem assemblies. A second Ethernet switch is communicatively coupled to the second Ethernet network interfaces of the multiple vehicle subsystem assemblies and provides network redundancy regarding the first Ethernet switch. For each vehicle subsystem assembly, a network controller determines whether the vehicle subsystem assembly is authorized to be included in the vehicular communication system, and in response to determining that the vehicle subsystem assembly is not authorized to be included in the vehicular communication system, control the first Ethernet switch and the second Ethernet switch to block Ethernet traffic corresponding to the vehicle subsystem assembly that is not authorized to be included in the vehicular communication system.

20 Claims, 12 Drawing Sheets

(56) References Cited

U.S. PATENT DOCUMENTS

2021/0126917 A1* 4/2021 Lin .................. H04L 12/40032
2021/0160315 A1* 5/2021 Linn-Moran ........... H04L 12/40
2021/0309167 A1* 10/2021 Gourari ................. G06V 20/56
2023/0033577 A1* 2/2023 Shah ....................... H04L 12/44

* cited by examiner

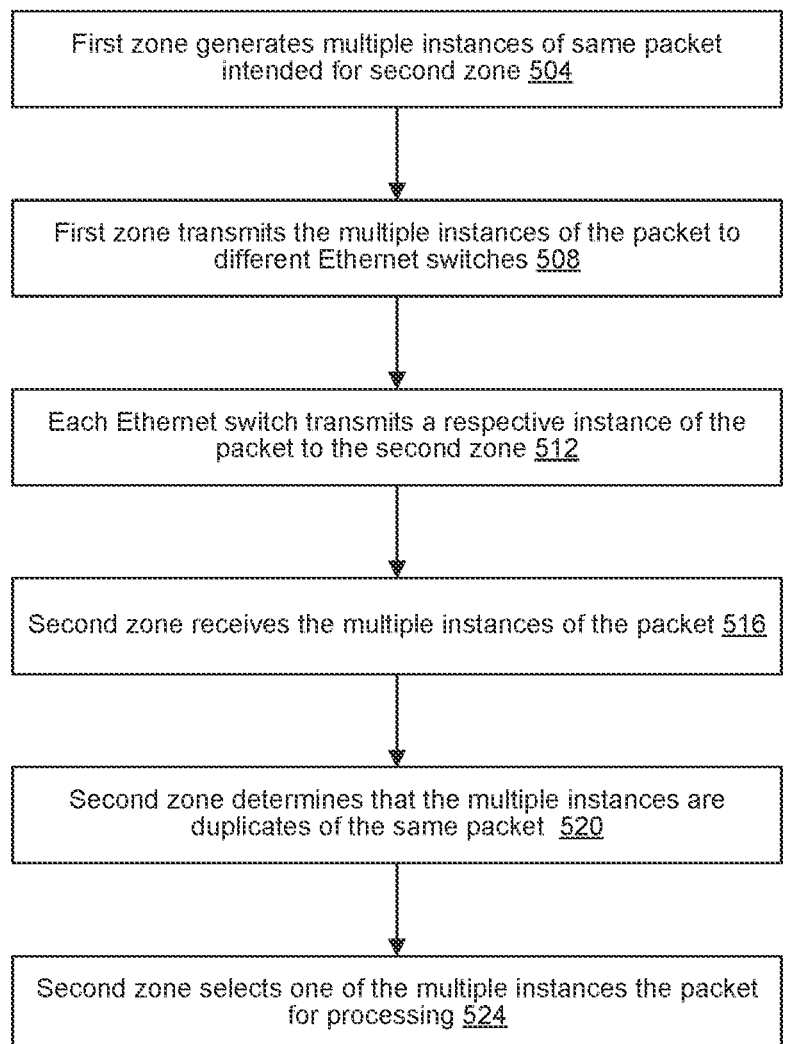

500

First zone generates multiple instances of same packet intended for second zone 504

First zone transmits the multiple instances of the packet to different Ethernet switches 508

Each Ethernet switch transmits a respective instance of the packet to the second zone 512

Second zone receives the multiple instances of the packet 516

Second zone determines that the multiple instances are duplicates of the same packet 520

Second zone selects one of the multiple instances the packet for processing 524

REDUNDANT AUTOMOTIVE ETHERNET

CROSS REFERENCES TO RELATED APPLICATIONS

This application claims the benefit of U.S. Provisional Patent App. No. 63/401,561, entitled "Dual Redundant Automotive Ethernet In-Vehicle-Network Architecture," filed on Aug. 26, 2022, the disclosure of which is expressly incorporated herein by reference in its entirety.

FIELD OF TECHNOLOGY

The present disclosure relates generally to in-vehicle communication networks, and more particularly to redundancy of in-vehicle communication networks.

BACKGROUND

In-vehicle communication networks permit components within a vehicle to exchange data. For example, Controller Area Network (CAN) is a communication standard that is widely used in the automotive industry. However, CAN has a limited transmission rate and requires significant amounts of wiring, among other limitations.

Automotive Ethernet is a type of Ethernet network adapted to the automotive environment, which enables high-speed data transfer within vehicles. Automotive Ethernet provides a significantly higher transmission rate as compared to CAN, which allows, among other things, the replacement of multiple CAN cables with a single Ethernet link. As a result, automotive Ethernet reduces the weight of wiring harnesses in vehicles while providing higher bandwidth data transmission compared to CAN. Because of the advantages of automotive Ethernet over CAN and because of the increasing adoption of advanced automotive technologies that require higher data rates, the use of automotive Ethernet in the automotive industry is significantly increasing In-vehicle communication networks have characteristics that are significantly different from typical Ethernet networks in a home or office environment. For instance, a communication disruption in an in-vehicle network while the vehicle is in motion may lead to a catastrophic failure, which may in turn lead to serious injury or death. As another example, unauthorized access to an in-vehicle network may result in inadvertent disruption to, or permit a malicious attack on, automotive systems.

SUMMARY

In an embodiment, a vehicular communication system comprises: a plurality of vehicle subsystem assemblies, each vehicle subsystem assembly configured to perform respective functions for the vehicle, and each vehicle subsystem assembly including at least i) a first Ethernet network interface, and ii) a second Ethernet network interface; a first Ethernet switch communicatively coupled to the first Ethernet network interfaces of the plurality of vehicle subsystem assemblies, the first Ethernet switch configured to provide a first Ethernet network that includes the plurality of vehicle subsystem assemblies; a second Ethernet switch communicatively coupled to the second Ethernet network interfaces of the plurality of vehicle subsystem assemblies, the second Ethernet switch configured to provide a second Ethernet network that includes the plurality of vehicle subsystem assemblies, the second Ethernet network providing network redundancy regarding the first Ethernet network; and a network controller configured to, for each vehicle subsystem assembly: determine whether the vehicle subsystem assembly is authorized to be included in the vehicular communication system, and in response to determining that the vehicle subsystem assembly is not authorized to be included in the vehicular communication system, control the first Ethernet switch and the second Ethernet switch to block Ethernet traffic corresponding to the vehicle subsystem assembly that is not authorized to be included in the vehicular communication system.

In another embodiment, a method is for communicating in a vehicular communication system that includes i) a plurality of vehicle subsystem assemblies, ii) a first Ethernet switch communicatively coupled to first Ethernet network interfaces of the plurality of vehicle subsystem assemblies, iii) a second Ethernet switch communicatively coupled to second Ethernet network interfaces of the plurality of vehicle subsystem assemblies, and iv) a network controller. The method includes: for each vehicle subsystem assembly, determine, by the network controller, whether the vehicle subsystem assembly is authorized to be included in the vehicular communication system; for each vehicle subsystem assembly, in response to determining that the vehicle subsystem assembly is not authorized to be included in the vehicular communication system, controlling, by the network controller, the first Ethernet switch and the second Ethernet switch to block Ethernet traffic corresponding to the vehicle subsystem assembly that is not authorized to be included in the vehicular communication system; for each vehicle subsystem assembly, in response to determining that the vehicle subsystem assembly is authorized to be included in the vehicular communication system, controlling, by the network controller, the first Ethernet switch and the second Ethernet switch to permit Ethernet traffic corresponding to the vehicle subsystem assembly is authorized to be included in the vehicular communication system; providing, by the first Ethernet switch, a first Ethernet network that includes a plurality of vehicle subsystem assemblies that are authorized to be included in the vehicular communication system; and providing, by the second Ethernet switch, a second Ethernet network that includes the plurality of vehicle subsystem assemblies that are authorized to be included in the vehicular communication system.

BRIEF DESCRIPTION OF THE DRAWINGS

FIG. 4 is a simplified diagram of an example network controller of the vehicle of FIG. 1, according to an embodiment.

FIG. 5 is a flow diagram of an example method for redundant communications in an in-vehicle network, according to an embodiment

DETAILED DESCRIPTION

As discussed above, communication disruptions within in-vehicle networks may lead to catastrophic failures. In an automotive environment, communication disruptions in a network may be caused by various circumstances, such as vibrations, improper maintenance, electrical disturbances, hostile environmental conditions (e.g., temperature, humidity, air pressure, etc.), an accident, etc.

In embodiments described below, an automotive network includes a plurality of vehicle subsystem assemblies and a plurality of Ethernet switches. Each of at least some of the vehicle subsystem assemblies is coupled to multiple ones of the Ethernet switches, which provides redundant network communications. Thus, in a situation where communication between a vehicle subsystem assembly and one Ethernet switch is disrupted because of a failure due to vibrations, corrosion, an accident, etc., for example, the vehicle subsystem assembly can continue network communications via another one of the Ethernet switches, in some embodiments.

Unauthorized access to an in-vehicle network could result in inadvertent disruption to, or permit a malicious attack on, automotive systems. Thus, in some embodiments described below, Ethernet switches of the in-vehicle network are configured to restrict access to the in-vehicle network to pre-authorized devices, e.g., the Ethernet switches disallow communications with unauthorized devices. Restriction of access to the in-vehicle network to pre-authorized devices reduces the risk of inadvertent and/or maliciously caused disruptions to the in-vehicle network, at least in some embodiments.

Figure 1:
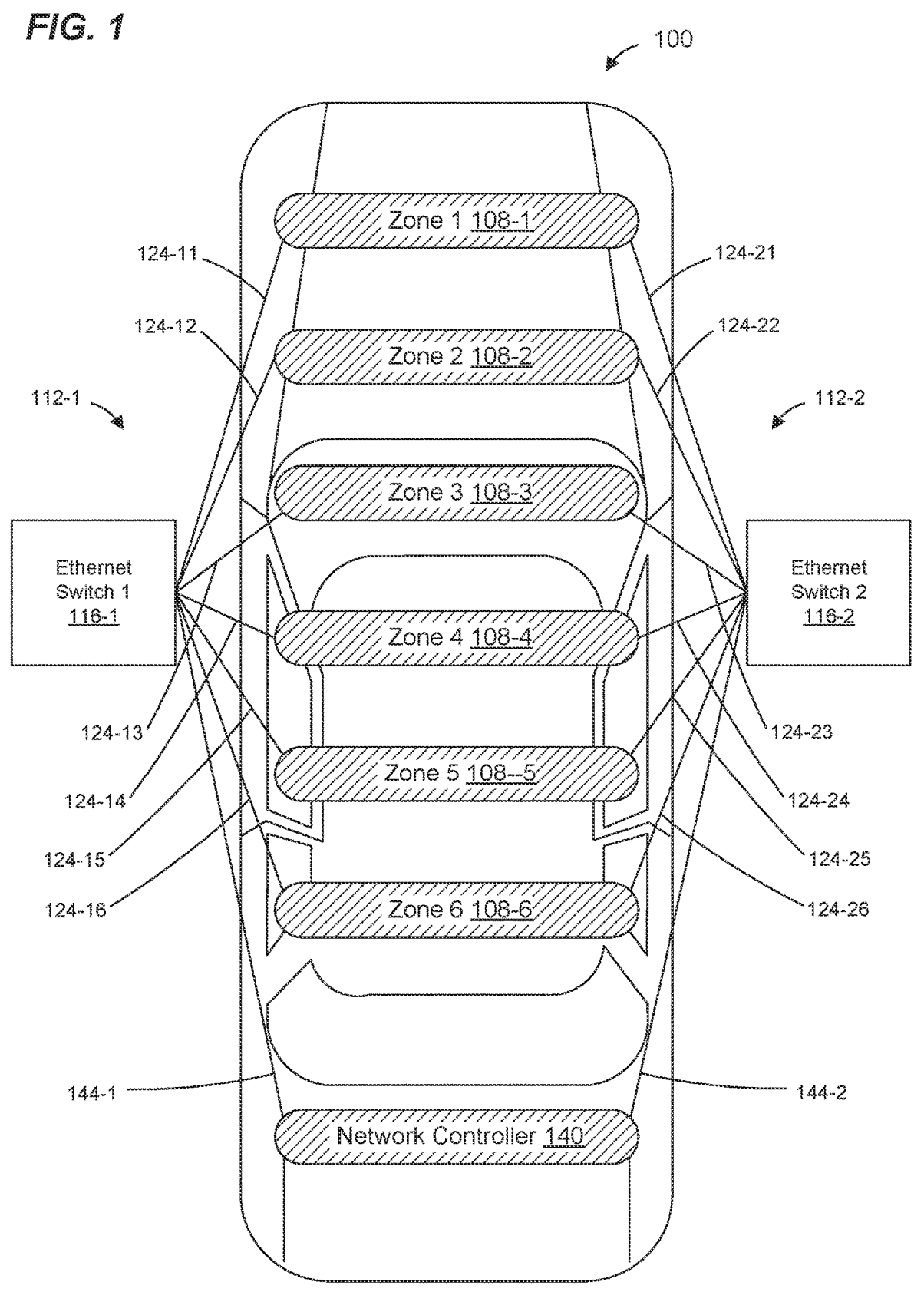
FIG. 1 is simplified diagram showing an example vehicle with an in-vehicle communication network that provides redundant communications, according to an embodiment.

FIG. 1 is simplified diagram showing an example vehicle 100 in which various aspects, features, and elements described herein are implemented in accordance with an embodiment of this disclosure. The vehicle 100 includes a communications network (or simply "network") that enables communication among different subsystems in the vehicle 100. The different subsystems are sometimes referred to herein as "vehicle subsystem assemblies" or "zones" 108. The network of the vehicle 100 also includes a plurality of Ethernet switch planes 112, each of which is communicatively coupled to each of the zones 108. The Ethernet switch planes 112 provide redundant network connectivity for the zones 108. Each Ethernet switch plane 112 corresponds to an Ethernet switch 116 that is communicatively connected to each of the zones 108 via a respective communication link 124. In various embodiments, each communication link 124 corresponds to a suitable cable such as an Ethernet 100BASE-T1 cable, an Ethernet 1000BASE-T1 cable, an IEEE 802.3ch compliant Multi-Gig Automotive Ethernet 2.5GBASE-T1, 5GBASE-T1, or 10GBASE-T1 over shielded twisted pair (STP) cable, etc.

Each Ethernet switch plane 112 is configured as a respective star topology network. In other embodiments, each Ethernet switch plane 112 is configured as a suitable topology different than a star topology.

Each zone 108 comprises a suitable combination of one or more of i) one or more sensors, ii) one or more actuators, iii) one or more control modules (e.g., comprising a hardware state machine and/or a processor that executes machine readable instructions stored in a memory device), etc., according to various embodiments. In some embodiments, each of one or more zones 108 includes a respective communication module (not shown) that communicatively connects the zone 108 with all of the Ethernet switches 116. In some embodiments, the communication module comprises an Ethernet gateway switch that i) communicatively connects each of at least some of the components within the zone 108 to all of the Ethernet switches 116, and ii) optionally, communicatively interconnects at least some components within the zone 108. As will be described in more detail below, each communication module of the zones 108 comprises a plurality of Ethernet network interfaces that communicatively couple the zone 108 to respective Ethernet switches 116.

The control modules can be implemented, for example, using a system-on-a-chip (SoC) or other electronic circuitry that includes one or more processor cores. A given processor core can be configured as a generalized unit such as a central processing unit (CPU), a special purpose unit such as a graphics processing unit (GPU), and/or other form of processing circuitry. For example, the control modules can be implemented using one or more special purpose processors, one or more digital signal processors, one or more microprocessors, one or more controllers, one or more microcontrollers, one or more integrated circuits, one or more Application Specific Integrated Circuits (ASICs), one or more Field Programmable Gate Arrays, one or more programmable logic arrays, one or more programmable logic controllers, one or more state machines, or any combination thereof. The control modules can execute programs based on stored code, including code stored in storage module comprising any tangible non-transitory computer-usable and/or computer-readable medium, capable of, for example, containing, storing, communicating, or transporting machine readable instructions, or any information associated therewith, for use by or in connection with the control module. For example, the storage module can include any form of volatile or non-volatile memory including one or more solid state drives, one or more memory cards, one or more removable media, one or more read-only memories, one or more random access memories, or any type of non-transitory media suitable for storing electronic information, or any combination thereof.

Examples of the kind of sensor devices that can be included, in any of the zones 108, include an imaging/ navigation sensor (e.g., video camera, radar, LiDAR, rangefinders or other proximity sensors, velocity sensors, accelerometers, infrared-sensing, acoustic-sensing (including ultrasonic sensors), GPS, etc.), and an environmental/ user-interface sensor (e.g., mass air flow, engine speed, acceleration, braking, traction, oxygen, fuel temperature, pressure, voltage, steering wheel position, seating position, eye tracking, etc.).

Some zones 108 of the vehicle 100 are configured to provide data to, and/or be controlled by, one or more of the control modules. For example, some of these subsystems may be associated with the vehicle's chassis, wheels, or powertrain (e.g., including a power source, suspension, drive shaft, axles, and exhaust system). The power source, such as an internal combustion engine, an electric motor, or a combination of an internal combustion engine and an electric motor, may be operative to provide kinetic energy as a motive force to one or more of the wheels.

One or more zones 108 are associated with driver controls (e.g., for power-up/ignition, steering, acceleration, and braking) and displays, or other user interface input and output elements, that are in communication with the network. Also, vehicles other than automobiles can include other subsystems including subsystems for other types of propulsion, such as a propellers for aerial vehicles. Any of a variety of modules of these subsystems can be electronically controllable modules that are controlled, at least in part, based on signals sent to or from one or more of the control modules. Communication nodes associated with these subsystems in different zones 108 communicate, via the Ethernet switches 116, with other zones 108, such as the powertrain, a steering subsystem, or both, for example, to control the vehicle 100, such as accelerating, decelerating, steering, or otherwise controlling the vehicle 100.

In some embodiments, one or more of the zones 108 include communication system(s) for communicating outside of the vehicle. In some embodiments, a zone 108 for communicating outside of the vehicle (referred to herein as a "communication gateway zone") includes a transceiver configured to communicate in a cell-based mobile communication network, a satellite communication network, a vehicular communication network that operates according to the IEEE 802.11p Standard and/or the IEEE 802.11bd Standard, etc.

In some embodiments, the communication gateway zone 108 includes a processor configured to communicate with one or more of i) a manufacturer of the vehicle, ii) a manufacturer of a component of the vehicle, iii) a maintenance and/or repair service provider, etc., according to some embodiments. In some embodiments, the processor is configured to store in a memory device of the communication gateway zone 108 data (e.g., diagnostics data, maintenance-related data, performance data, etc.) gathered by the processor from other zones 108 via one or both of the Ethernet switch planes 112, and to transmit at least some of the data stored in the memory device to a server (e.g., of a manufacturer of the vehicle, a manufacturer of a component of the vehicle, a maintenance and/or repair service provider, etc.) via the transceiver. In some embodiments, the processor is configured to gather data (e.g., diagnostics data, maintenance-related data, performance data, etc.) from other zones 108 via one or both of the Ethernet switch planes 112, and to transmit at least some of the data stored in the memory device to a server (e.g., of a manufacturer of the vehicle, a manufacturer of a component of the vehicle, a maintenance and/or repair service provider, etc.), in response to a request received from the server via the transceiver.

The Ethernet switches 116 are configured according to an Ethernet communication protocol to facilitate transmission of potentially large amounts of data amongst the zones 108.

For example, the Ethernet switches 116 are configured to direct sensor data from sensors of the zones 108 to one or more of the control modules of the zones 108.

As will be described in more detail below, each zone 108 is configured to, when the zone 108 is to transmit an Ethernet packet intended for a target zone 108, transmit multiple instances of the Ethernet packet to the multiple Ethernet switches 116 via respective communication links 124. Each Ethernet switch 116 then forwards the respective instance of the Ethernet packet to the intended target zone 108. Because multiple instances of the same Ethernet packet are transmitted to a target zone 108 via different switch planes 112, communication redundancy is achieved. If communication of the Ethernet packet via one of the switch planes 112 is disrupted, one or more other instances of the packet will be transmitted to the target zone 108 via one or more other switch planes 112.

As will be described in more detail below, each zone 108 is configured to, when the zone 108 receives multiple instances of a same Ethernet packet, i) detect the multiple instances of the same Ethernet packet, ii) choose one of the instances to process, and iii) discard one or more remaining instances of the same Ethernet packet.

The vehicle 100 also includes a network controller 140 that communicates with the plurality of Ethernet switches 116. In an embodiment, the network controller 140 is separate from and communicatively connected to the Ethernet switches 116 via respective communication links 144. In various embodiments, each communication link 144 corresponds to a suitable cable such as an Ethernet 100BASE-T1 cable, an Ethernet 1000BASE-T1 cable, an IEEE 802.3ch compliant Multi-Gig Automotive Ethernet 2.5GBASE-T1, 5GBASE-T1, or 10GBASE-T1 over STP cable, etc. In other embodiments, the network controller 140 is included in one of the Ethernet switches 116 (e.g., the Ethernet switch 116-1), and is communicatively connected to one or more other Ethernet switches 116 via one or more respective communication links 144. In some such embodiments, to avoid switching loop situations/broadcast storms, the Ethernet switch 116-1 that implements the network controller 140 is configured to i) avoid transmitting packets intended for Ethernet switch plane 112-1 via the one or more respective communication links 144 connected to the other Ethernet switch(es) 116-2, and/or ii) avoid transmitting packets that were received via the one or more respective communication links 144 connected to the other Ethernet switch(es) 116-2 on any of the communication links 124-1x.

As will be described in more detail below, the network controller 140 is configured to determine whether a new zone 108 added to the vehicle 100 is authorized, and to control the Ethernet switches 116 to selectively permit the new zone 108 to join the switch planes 112 based on whether the new zone 108 is authorized, in some embodiments.

In some embodiments, the network controller 140 is configured to determine whether a new zone 108 added to the vehicle 100 is communicating with all of the Ethernet switches 116, and to selectively permit the new zone 108 to join any of the switch planes 112 based on whether the new zone 108 is communicating with all of the Ethernet switches 116. For example, if a new zone 108 added to the vehicle 100 is communicating with the Ethernet switch 116-1 but is not communicating with the Ethernet switch 116-2, the network controller 140 instructs the Ethernet switch 116-1 to prevent the new zone 108 from joining the switch plane 112-1 because the new zone 108 is unable to communicate redundantly via multiple switch planes 112.

Although each zone 108 is illustrated in FIG. 1 as communicatively connecting to two Ethernet switch planes 112 and Ethernet switches 116, in other embodiments, the vehicle 100 includes another suitable number of Ethernet switch planes 112/Ethernet switches 116 greater than two (e.g., three, four, five, etc), and each of at least some zones 108 is communicatively connected to more than two Ethernet switch planes 112 and Ethernet switches 116.

Each Ethernet switch 116 is physically spaced apart from one or more other Ethernet switches 116 in the vehicle 100 to reduce chances that all of the Ethernet switches 116 are disabled in an event or occurrence such as an accident, an equipment failure, localized corrosion, etc. Similarly, for each of at least some of the zones 108, respective cabling 124 corresponding to each of the Ethernet switches 116 is routed within the vehicle 100 along respective physical paths that are physically spaced apart from one another along at least portions of the paths to reduce chances that all of the cabling 124 connected to the zone 108 is damaged in an event or occurrence such as an accident, an equipment failure, localized corrosion, etc.

Figure 2:
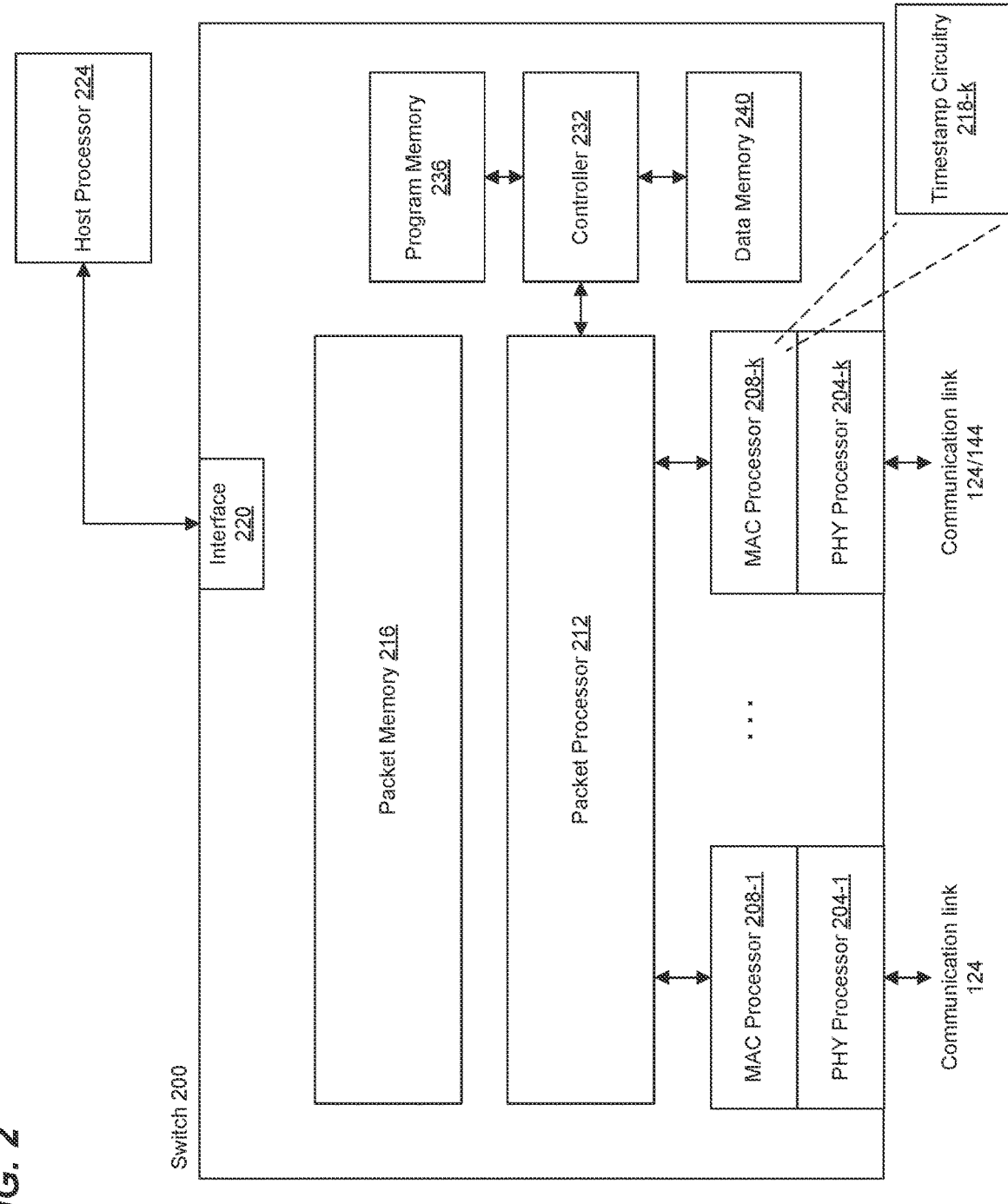
FIG. 2 is a simplified diagram of an example Ethernet switch of the vehicle of FIG. 1, according to an embodiment.

FIG. 2 is a simplified diagram of an example Ethernet switch 200, according to an embodiment. The structure of the Ethernet switch 200 corresponds to the Ethernet switches 116 of FIG. 1, in an embodiment. The Ethernet switch 200 is described with reference to FIG. 1 for ease of explanation, and like-numbered elements are not described in detail for brevity. In other embodiments, one or more of the Ethernet switches 116 have a suitable structure that is different than the Ethernet switch 200 of FIG. 2. In some embodiments, the Ethernet switch 200 is included in another suitable in-vehicle network different than the network of the vehicle 100 of FIG. 1.

The Ethernet switch 200 is configured to communicatively couple to one or more vehicle subsystem assemblies (e.g., the zones 108) and/or a network controller (e.g., the network controller 140) via one or more respective communication links (e.g., the communication links 124/140).

The Ethernet switch 200 includes a plurality of physical layer (PHY) processors 204 that are configured to communicatively connect with respective links 124/140. Each PHY processor 204 is configured to perform PHY protocol operations with respect to packets that are received via the respective communication link 124/140 and that are to be transmitted via the respective communication link 124/140, in an embodiment. Each PHY processor 204 comprises one or more transceivers (not shown in FIG. 2). Each PHY processor 204 corresponds to a respective port of the Ethernet switch 200.

The Ethernet switch 200 also includes one or more media access control (MAC) processors 208. The MAC processors 208 are configured to perform MAC layer protocol operations with respect to packets that are received via the communication links 124/140 and that are to be transmitted via the communication links 124/140, in an embodiment. Each PHY processor 204 is configured to receive packet data from a respective MAC processor 208, generate a transmit signal corresponding to the packet data, and transmit the signal via the respective communication link 124/140. Similarly, each PHY processor 204 is configured to receive a signal from a respective communication link 124/140, decode packet data from the receive signal, and then transfer the packet data to the respective MAC processor 208.

In an embodiment, each PHY processor 204/MAC processor 208 pair corresponds to a respective Ethernet network interface.

The network switch 200 also includes a packet processor 212. The packet processor 212 is configured to process at least headers of packets received via the communication links 124/140 to determine communication links 124/140 and/or ports via which the packets are to be transmitted. The network switch 200 further includes a packet memory 216 configured to store packets while the packets are processed by the packet processor 212.

In some embodiments, the packet processor 212 includes hardware circuitry, such as hardware state machines, memory, registers, etc., that is configured to perform various functions associated with the packet processor 212. In other embodiments, the packet processor 212 also includes a processor that executes machine readable instructions to perform some functions associated with the packet processor 212. In some such embodiments, the machine readable instructions are stored in a program memory (not shown) included in, or coupled to, the packet processor 212. In some embodiments, the program memory and a data memory of, or coupled to, the packet processor 212 are implemented using a set of one or more shared memory devices. In other embodiments, the program memory and the data memory are implemented using different memory devices.

In some embodiments, each MAC processor 208 includes respective timestamp circuitry 218 that is configured to i) determine respective times at which packets are received ("receive times") at the MAC processor 208 via the communication link 124/144, and ii) associate the respective receive times with the packets. For example, the timestamp circuitry 218 is configured to add a timestamp that indicates the receive time to i) the packet, ii) a tag appended to the packet by the MAC processor 208, iii) metadata that is logically connected to the packet, etc., according to various embodiments. In some embodiments, the timestamp circuitry 218 is additionally or alternatively configured to i) determine respective times at which packets are transferred ("transmit times") by the MAC processor 208 to the PHY processor 204 for transmission via the communication link 124/144, and ii) associate the respective transmit times with the packets. For example, the timestamp circuitry 218 is configured to add a timestamp that indicates the transmit time to metadata that is logically connected to the packet, according to an embodiment.

In other embodiments, respective timestamp circuitry 218 is included in each PHY processor 204, and each timestamp circuitry 218 is configured to i) determine respective times at which packets are received ("receive times") at the PHY processor 204 via the communication link 124/144, and ii) associate the respective receive times with the packets; and/or iii) determine respective times at which packets are transmitted ("transmit times") by the PHY processor 204 via the communication link 124/144, and ii) associate the respective transmit times with the packets.

In still other embodiments, timestamp circuitry 218 is included in the packet processor 212, and the timestamp circuitry 218 is configured to i) determine respective times at which packets are received ("receive times") at the packet processor 212 via the communication links 124/144, and ii) associate the respective receive times with the packets; and/or iii) determine respective times at which packets are transferred ("transmit times") by the packet processor 212 to the MAC processors 208 for transmission via the communication link 124/144, and ii) associate the respective transmit times with the packets.

The network switch 200 also includes a host communication interface 220 configured to handle communications with a host processor 224. The host communication interface 220 is coupled to the packet processor 212 and/or the packet memory 216, in various embodiments. The host communication interface 220 comprises a suitable communication interface such as an Ethernet network interface or another suitable communication interface. In an embodiment, the communication interface 220 includes a PHY processor 204 and a MAC processor 208, such as described above, and the MAC processor of the host interface 220 is coupled to the packet processor 212. In some embodiments, the host processor 224 and the host communication interface 220 are omitted The host processor 204 is configured to execute machine readable instructions stored in a memory device (not shown) included in or coupled to the host processor 204. The host processor 204 is configured to perform zone authentication functions described below, according to some embodiments. The host processor 204 is additionally or alternatively configured to perform network monitoring functions described below, according to some other embodiments. The host processor 204 is additionally or alternatively configured to implement a network controller such as the network controller 140 of FIG. 1, according to some other embodiments.

The network switch 200 also includes a controller 232 that is coupled to the packet processor 212 and/or the packet memory 216, in various embodiments. The controller 232 is configured to execute machine readable instructions stored in a program memory 236. The controller 232 is also coupled to a data memory 240. In some embodiments, the program memory 236 and the data memory 240 are implemented using a set of one or more shared memory devices. In other embodiments, the program memory 236 and the data memory 240 are implemented using different memory devices.

The controller 232 is configured to perform zone authentication functions described below, according to some embodiments. The controller 232 is additionally or alternatively configured to perform network monitoring functions described below, according to some other embodiments. The controller 232 is additionally or alternatively configured to implement a network controller such as the network controller 140 of FIG. 1, according to some other embodiments.

Figure 3:
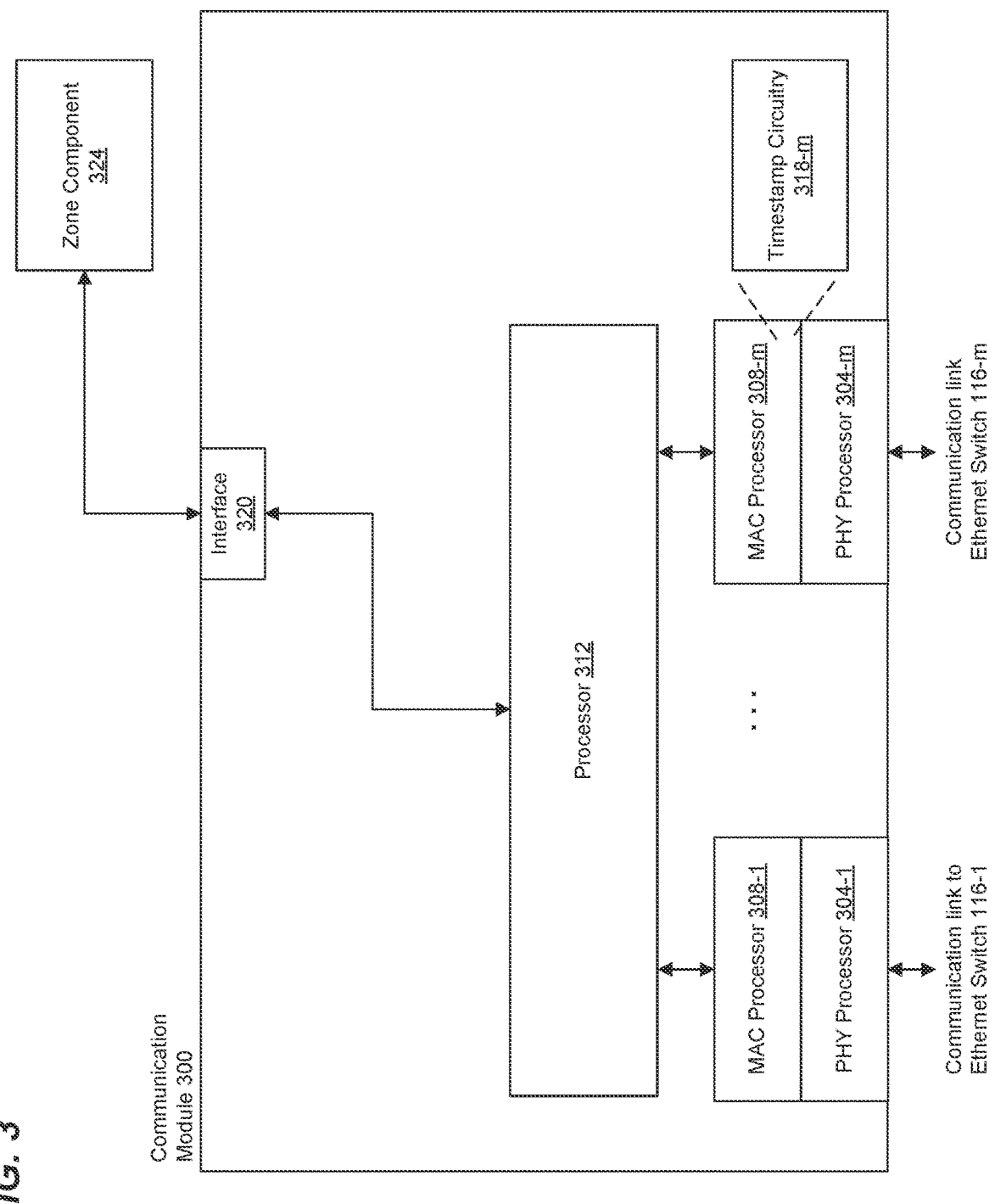
FIG. 3 is a simplified diagram of an example communication module of a vehicle subsystem assembly of the vehicle of FIG. 1, according to an embodiment.

FIG. 3 is a simplified diagram of an example communication module 300 that is included in one or more of the zones 108 of FIG. 1, according to an embodiment. The communication module 300 is described with reference to FIG. 1 for ease of explanation. In other embodiments, one or more of the communication modules of the zones 108 have a suitable structure that is different than the communication module 300 of FIG. 3. In some embodiments, the communication module 300 is included in another suitable in-vehicle network different than the network of the vehicle 100 of FIG. 1.

The communication module 300 is configured to communicatively couple to a plurality of Ethernet switches (e.g., the Ethernet switches 116) via respective communication links (e.g., the communication links 124). The communication module 300 is configured to communicatively couple to one or more other components of the zone 108 (e.g., a sensor, an actuator, a display, a control module, etc.) via one or more respective communication interfaces.

The communication module 300 includes a PHY processors 304 that are configured to communicatively connect with respective links 124. Each PHY processor 304 is configured to perform PHY protocol operations with respect to packets that are received via the respective communication link 124 and that are to be transmitted via the respective communication link 124, in an embodiment. Each PHY processor 304 comprises one or more transceivers (not shown in FIG. 3). Each PHY processor 304 corresponds to a respective Ethernet port of the communication module 300. Each PHY processor 304 has a structure that is the same as or similar to the PHY processor 204 of FIG. 2, in some embodiments.

The communication module 300 also includes one or more MAC processors 308. The MAC processors 308 are configured to perform MAC layer protocol operations with respect to packets that are received via the communication links 124 and that are to be transmitted via the communication links 124, in an embodiment. Each PHY processor 304 is configured to receive packet data from a respective MAC processor 308, generate a transmit signal corresponding to the packet data, and transmit the signal via the respective communication link 124. Similarly, each PHY processor 304 is configured to receive a signal from a respective communication link 124, decode packet data from the receive signal, and then transfer the packet data to the respective MAC processor 308. Each MAC processor 308 has a structure that is the same as or similar to the MAC processor 208 of FIG. 2, in some embodiments.

In an embodiment, each PHY processor 304/MAC processor 308 pair corresponds to a respective Ethernet network interface.

The communication module 300 also includes a processor 312. As will be described in more detail below, the processor 312 is configured to receive data from one or more components of the zone 108 and forward the data to the MAC processors 308 for transmission to the Ethernet switches 116. Additionally, as will be described in more detail below, the processor 312 is configured to receive packet data from the MAC processors 308, the packet data having been received by the MAC processors 308 from the Ethernet switches 116 in Ethernet packets, and forward the packet data to one or more components of the zone 108

In some embodiments, the processor 312 includes hardware circuitry, such as hardware state machines, memory, registers, etc, that is configured to perform various functions associated with the packet processor 312. In other embodiments, the packet processor 312 additionally or alternatively includes a processor that executes machine readable instructions to perform some functions associated with the processor 312. In some such embodiments, the machine readable instructions are stored in a program memory (not shown) included in, or coupled to, the processor 312. In some embodiments, the program memory and a data memory of, or coupled to, the packet processor 312 are implemented using a set of one or more shared memory devices. In other embodiments, the program memory and the data memory are implemented using different memory devices.

In some embodiments, each MAC processor 308 includes respective timestamp circuitry 318 that is configured to i) determine respective times at which packets are received ("receive times") at the MAC processor 308 via the communication link 124, and ii) associate the respective receive times with the packets. For example, the timestamp circuitry 318 is configured to add a timestamp that indicates the receive time to i) the packet, ii) a tag appended to the packet by the MAC processor 308, iii) metadata that is logically connected to the packet, etc., according to various embodiments. In some embodiments, the timestamp circuitry 318 is additionally or alternatively configured to i) determine respective times at which packets are transferred ("transmit times") by the MAC processor 308 to the PHY processor 304 for transmission via the communication link 124, and ii)

associate the respective transmit times with the packets. For example, the timestamp circuitry 318 is configured to add a timestamp that indicates the transmit time to metadata that is logically connected to the packet, according to an embodiment.

In other embodiments, respective timestamp circuitry 318 is included in each PHY processor 304, and each timestamp circuitry 318 is configured to i) determine respective times at which packets are received ("receive times") at the PHY processor 304 via the communication link 124, and ii) associate the respective receive times with the packets; and/or iii) determine respective times at which packets are transmitted ("transmit times") by the PHY processor 204 via the communication link 124, and ii) associate the respective transmit times with the packets.

In still other embodiments, timestamp circuitry 218 is included in the processor 312, and the timestamp circuitry 318 is configured to i) determine respective times at which packets are received ("receive times") at the processor 312 via the communication links 124, and ii) associate the respective receive times with the packets; and/or iii) determine respective times at which packets are transferred ("transmit times") by the processor 312 to the MAC processors 308 for transmission via the communication link 124, and ii) associate the respective transmit times with the packets.

The processor 312 is configured to perform functions associated with redundant communications in an in-vehicle network. For example, the processor 312 receives data from the component 324 that is to be sent to another zone 108, generates multiple duplicate Ethernet packets that include the data, and sends the duplicate Ethernet packets to the Ethernet switches 116 via the communication links 124. As another example, the processor 312 receives multiple duplicate packets from the Ethernet switches 116 via the communication links 124, the multiple duplicate packets having originated at another zone 108; the processor 312 detects the multiple duplicate packets; the processor 312 selects one of the duplicate packets; and the processor 312 forwards only the selected one duplicate packet to the component 324 via the communication interface 320.

Additionally or alternatively, the processor 312 is configured to perform zone authentication functions described below, according to some embodiments.

Figure 4:
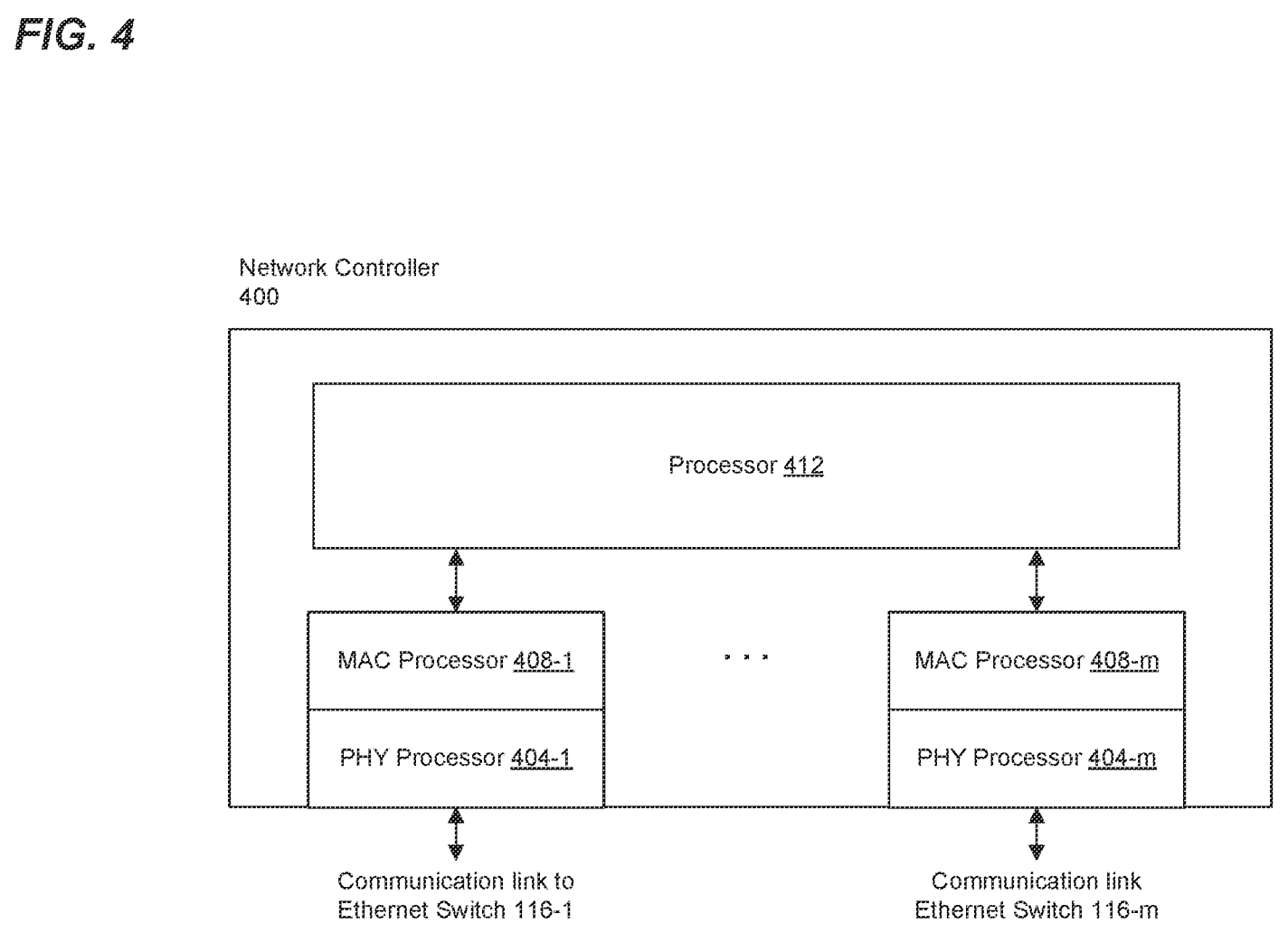

FIG. 4 is a simplified diagram of an example network controller 400 corresponding to the network controller 140 of FIG. 1, according to an embodiment. The network controller 400 is described with reference to FIG. 1 for ease of explanation. In other embodiments, the network controller 140 has a suitable structure that is different than the network controller 400 of FIG. 4. For example, as discussed above, the network controller 140 is implemented in one or more of the Ethernet switches 116, in some embodiments. The network controller 400 is included in another suitable in-vehicle network different than the network of the vehicle 100 of FIG. 1, according to some embodiments.

The network controller 400 is configured to communicatively couple to a plurality of Ethernet switches (e.g., the Ethernet switches 116) via respective communication links (e.g., the communication links 144) The network controller 400 includes a PHY processors 404 that are configured to communicatively connect with respective links 144. Each PHY processor 404 is configured to perform PHY protocol operations with respect to packets that are received via the respective communication link 144 and that are to be transmitted via the respective communication link 144, in an embodiment. Each PHY processor 404 comprises one or more transceivers (not shown in FIG. 4). Each PHY processor 404 corresponds to a respective Ethernet port of the network controller 400. Each PHY processor 404 has a structure that is the same as or similar to the PHY processor 204 of FIG. 2, in some embodiments.

The network controller 400 also includes one or more MAC processors 408. The MAC processors 408 are configured to perform MAC layer protocol operations with respect to packets that are received via the communication links 144 and that are to be transmitted via the communication links 144, in an embodiment. Each PHY processor 404 is configured to receive packet data from a respective MAC processor 408, generate a transmit signal corresponding to the packet data, and transmit the signal via the respective communication link 144. Similarly, each PHY processor 404 is configured to receive a signal from a respective communication link 144, decode packet data from the receive signal, and then transfer the packet data to the respective MAC processor 408. Each MAC processor 408 has a structure that is the same as or similar to the MAC processor 208 of FIG. 2, in some embodiments.

In an embodiment, each PHY processor 404/MAC processor 408 pair corresponds to a respective Ethernet network interface.

The network controller 400 also includes a processor 412. As will be described in more detail below, the processor 412 is configured to determine whether a new zone 108 added to the vehicle 100 is authorized, and to control the Ethernet switches 116 to selectively permit the new zone 108 to join the switch planes 112 based on whether the new zone 108 is authorized, in some embodiments. In some embodiments, the processor 412 is configured to determine whether a new zone 108 added to the vehicle 100 is communicating with all of the Ethernet switches 116, and to selectively permit the new zone 108 to join any of the switch planes 112 based on whether the new zone 108 is communicating with all of the Ethernet switches 116. For example, if a new zone 108 added to the vehicle 100 is communicating with the Ethernet switch 116-1 but is not communicating with the Ethernet switch 116-2, the processor 412 instructs the Ethernet switch 116-1 to prevent the new zone 108 from joining the switch plane 112-1 because the new zone 108 is unable to communicate redundantly via multiple switch planes 112.

In some embodiments, the processor 412 includes hardware circuitry, such as hardware state machines, memory, registers, etc., that is configured to perform various functions associated with the packet processor 412. In other embodiments, the packet processor 412 additionally or alternatively includes a processor that executes machine readable instructions to perform some functions associated with the processor 412. In some such embodiments, the machine readable instructions are stored in a program memory (not shown) included in, or coupled to, the processor 412. In some embodiments, the program memory and a data memory of, or coupled to, the packet processor 412 are implemented using a set of one or more shared memory devices. In other embodiments, the program memory and the data memory are implemented using different memory devices.

FIG. 5 is a flow diagram of an example method 500 for redundant communications in an in-vehicle network, according to an embodiment. The method 500 is implemented in the network of the vehicle 100 of FIG. 1, according to an embodiment. Additionally or alternatively, the method 500 is implemented using Ethernet switches having a structure like the Ethernet switch 200 of FIG. 2, in some embodiments. Additionally or alternatively, the method 500 is implemented using communication modules like the communication module 300 of FIG. 3, in some embodiments. FIG. 5 is described with reference to FIGS. 1-3 for ease of explanation. In other embodiments, the method 500 is implemented in another suitable vehicle different than the vehicle 100 of FIG. 1, and/or using other suitable Ethernet switches and/or communication modules different than the Ethernet switch 200 of FIG. 2 and the communication module 300 of FIG. 3.

At block 504, a first communication module of a first zone (e.g., a first vehicle subsystem assembly) generates multiple instances of a same Ethernet packet intended for a second zone (e.g., a second vehicle subsystem assembly). For example, a first communication module such as the communication module 300 generates the multiple instances of the same Ethernet packet. In an embodiment, the first communication module receives data from another component (e.g., the component 324), and generating multiple instances of the same Ethernet packet at block 504 includes: generating a first instance of the Ethernet packet to include the data received from the other component, and generating at least a second instance of the Ethernet packet that is a duplicate of the first instance. In some embodiments, the data is received by the first communication module in an initial Ethernet packet, and the first instance of the Ethernet packet includes Ethernet header information (e.g., a destination address) that is different than corresponding header information in the initial Ethernet packet.

The multiple instances of the same Ethernet packet include information to assist the second communication module of the second zone in identifying the multiple instances of the same Ethernet packet as being duplicate Ethernet packets. For example, the multiple instances of the same Ethernet packet include a same sequence number, e.g., in a transmission control protocol (TCP) header, in a proprietary header, etc., within a payload of the Ethernet packet. In an embodiment in which the first communication module receives data from another component (e.g., the component 324) that is not in an Ethernet packet, the first communication module generates the information to assist the second communication module of the second zone in identifying the multiple instances of the same Ethernet packet as being duplicate Ethernet packets (e.g., a sequence number). In an embodiment in which the first communication module receives the data in an initial Ethernet packet, the information to assist the second communication module of the second zone in identifying the multiple instances of the same Ethernet packet as being duplicate Ethernet packets (e.g., a sequence number) is included in the initial Ethernet packet, i.e., the other component (e.g., the component 324) generates the information to assist the second communication module of the second zone in identifying the multiple instances of the same Ethernet packet as being duplicate Ethernet packets (e.g., the sequence number)

At block 508, the first communication module of the first zone transmits the multiple instances of the same Ethernet packet to multiple different Ethernet switches. For example, the first communication module (e.g., the communication module 300) transmits respective instances of the same Ethernet packet to respective Ethernet switches 116 via respective network interfaces (e.g., respective PHY processor 304/MAC processor 308 pairs) of the first communication module.

At block 512, each Ethernet switch transmits the respective instance of the Ethernet packet to a second communication module of a second zone. For example, each Ethernet switch (e.g., such as the Ethernet switch 200) analyzes header information in the respective instance of the Ethernet packet to identity the second communication module as being the intended destination of the Ethernet packet, and transmits the respective instance of the Ethernet packet to the second communication module via a respective communication link 124.

At block 516, the second communication module of the second zone receives the multiple instances of the same Ethernet packet to from different Ethernet switches. For example, the second communication module (e.g., the communication module 300) receives respective instances of the same Ethernet packet from respective Ethernet switches 116 via respective network interfaces (e.g., respective PHY processor 304/MAC processor 308 pairs) of the first communication module.

At block 520, the second communication module determines that the multiple instances of the Ethernet packet are duplicates of the same Ethernet packet. For example, the second communication module (e.g., the processor 312) examines information in payloads of the multiple instances and, optionally, information in Ethernet headers of the multiple instances, to determine that the multiple instances of the same Ethernet packet are duplicates of the same Ethernet packet. For example, the multiple instances of the same Ethernet packet include a same sequence number, e.g., in a TCP header, in a proprietary header, etc, within a payload of the Ethernet packet, and the second communication module (e.g., the processor 312) uses the sequence number to determine that the multiple instances of the Ethernet packet are duplicates of the same Ethernet packet, in an embodiment. As another example, the multiple instances of the same Ethernet packet include a same sequence number/Ethernet source address pair, and the second communication module (e.g., the processor 312) uses the sequence number/Ethernet source address pair to determine that the multiple instances of the Ethernet packet are duplicates of the same Ethernet packet, in another embodiment. As another example, the multiple instances of the same Ethernet packet include a same sequence number/ Ethernet source address/Ethernet destination address tuple, and the second communication module (e.g., the processor 312) uses the sequence number/Ethernet source address/ Ethernet destination address tuple to determine that the multiple instances of the Ethernet packet are duplicates of the same Ethernet packet, in another embodiment. In other embodiments, the second communication module determines that the multiple instances of the Ethernet packet are duplicates of the same Ethernet packet using other suitable information the multiple instances of the Ethernet packet At block 524, the second communication module selects one of the instances of the Ethernet packet received at block 516 for processing by the second zone. For example, the second communication module (e.g., the processor 312) selects a first-received instance of the Ethernet packet for processing, and discards one or more later-received instances of the Ethernet packet. In some embodiments, processing of the Ethernet packet includes the communication module sending packet data included in the Ethernet packet to another component of the second zone (e.g., the component 324).

Figure 6:
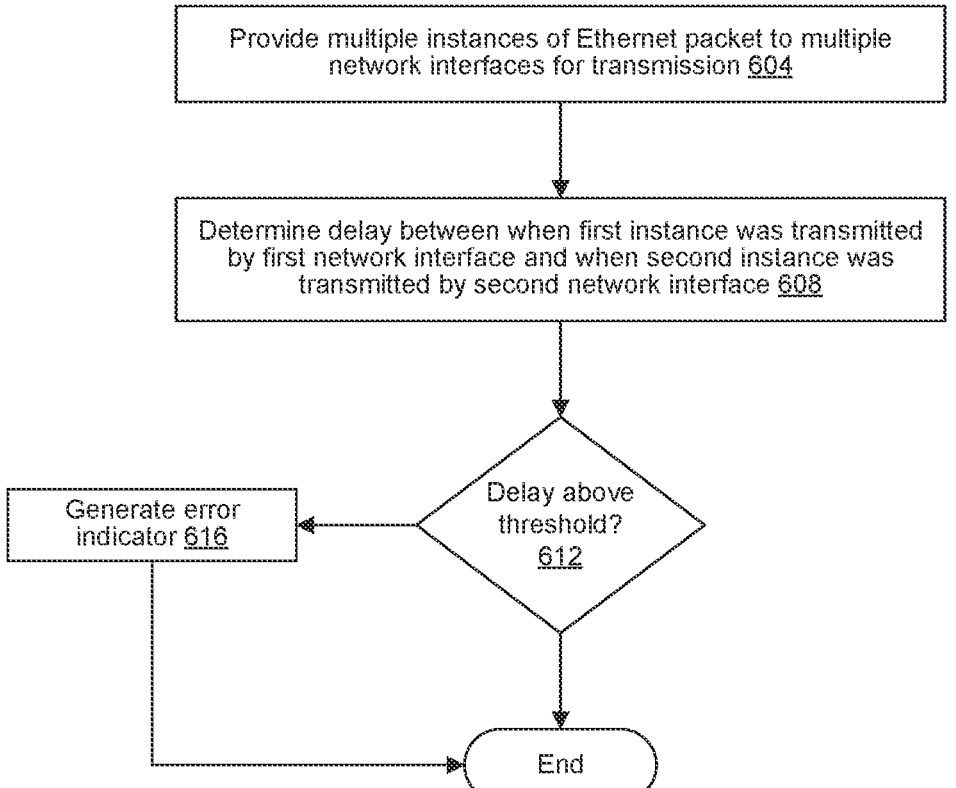
FIG. 6 is a flow diagram of an example method for transmitting packets in an in-vehicle network that provides redundant communications, according to an embodiment.

FIG. 6 is a flow diagram of an example method 600 for transmitting packets in an in-vehicle network that provides redundant communications, according to an embodiment. The method 600 is implemented in the network of the vehicle 100 of FIG. 1, according to an embodiment. Additionally or alternatively, the method 600 is implemented using a communication module like the communication module 300 of FIG. 3, in some embodiments. FIG. 6 is described with reference to FIGS. 1 and 3 for ease of explanation. In other embodiments, the method 600 is implemented in another suitable vehicle different than the vehicle 100 of FIG. 1, and/or using another suitable communication module different than the communication module 300 of FIG. 3.

At block 604, a communication module (e.g., the communication module 300) provides multiple instances of a same Ethernet packet to multiple network interfaces of the communication module for transmission to respective Ethernet switches (e.g., the Ethernet switches 116) via respective communication links (e.g., respective communication links 124). For example, the processor 312 provides multiple instances of the Ethernet packet to respective MAC processors 308 for transmission via respective communication links 124.

At block 608, the communication module determines a delay between i) when a first network interface of the communication module transmits a first instance of the Ethernet packet via a first communication link, and ii) when a second network interface of the communication module transmits a second instance of the Ethernet packet via a second communication link. For example, first timestamping circuitry 318-1 in a first network interface generates a first timestamp that indicates a first time when the first network interface transmitted the first instance of the Ethernet packet, and second timestamping circuitry 318-1 in a second network interface generates a second timestamp that indicates a second time when the second network interface transmitted the second instance of the Ethernet packet, in an embodiment. The processor 312 determines a delay by comparing the first timestamp and the second timestamp, according to an embodiment.

At block 612, the communication module determines whether the delay determined at block 608 is above a threshold. For example, the processor 312 determines whether the delay determined at block 608 is above a threshold.

In response to determining at block 612 that the delay is below the threshold, the flow 600 ends. On the other hand, in response to determining at block 612 that the delay is above the threshold, the flow proceeds to block 616. At block 616, the communication module generates an error indicator. For example, if the delay determined at block 608 is above the threshold, this may indicate that the communication module 300, one of the Ethernet switches 116, and/or the in-vehicle network is operating suboptimally, and that maintenance and/or diagnostics is warranted, in some embodiments.

In networks that include more than two Ethernet switches, blocks 608 and 612 are repeated for different pairs of instances of the Ethernet packet, in some embodiments. In other embodiments networks that include more than two Ethernet switches, the delay determined at block 608 is determined with respect to an earliest transmitted instance and a latest transmitted instance of the Ethernet packet.

In some embodiments, the method 600 further includes transmitting, by the communication module, the error indicator to the network controller (e.g., the network controller 140) via one or both of the Ethernet switch planes 112.

In an embodiment, the method 600 additionally or alternatively includes the communication module sending the error indicator to the communication gateway zone 108 via one or both of the Ethernet switch planes 112, and the communication gateway zone 108 transmits the error indicator to a server (e.g., of a manufacturer of the vehicle, a manufacturer of a component of the vehicle, a maintenance and/or repair service provider, etc.) via the transceiver of the communication gateway zone 108. In an embodiment, the communication module additionally or alternatively sends the error indicator via one or both of the Ethernet switch planes 112 to a zone 108 that includes a user display device, and the zone displays the error indicator on the user display device.

Figure 7:
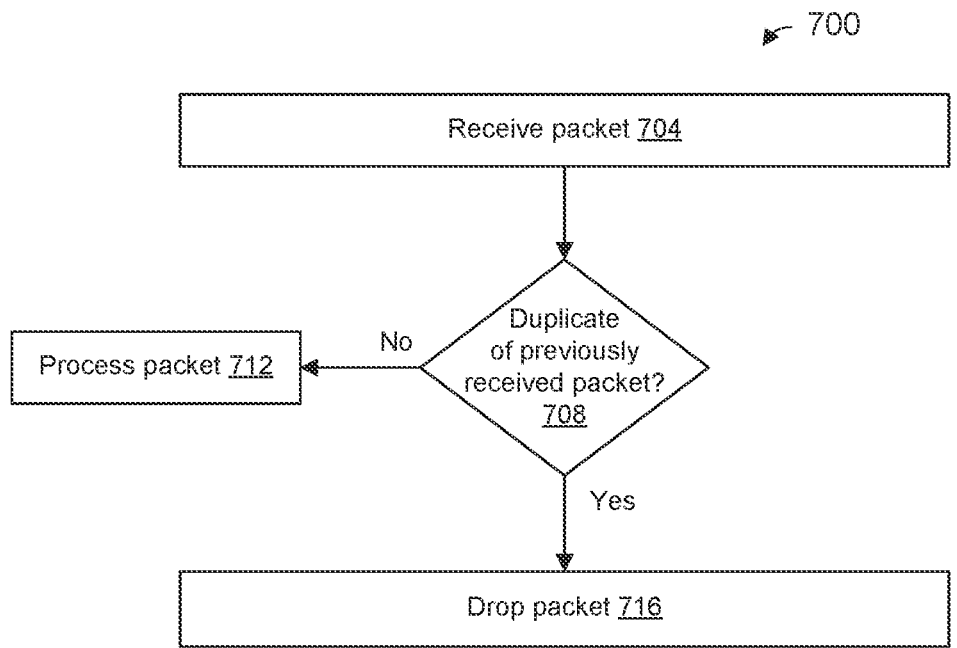
FIG. 7 is a flow diagram of an example method for processing received packets in an in-vehicle network that provides redundant communications, according to an embodiment.

FIG. 7 is a flow diagram of an example method 700 for processing received packets in an in-vehicle network that provides redundant communications, according to an embodiment. The method 700 is implemented in the network of the vehicle 100 of FIG. 1, according to an embodiment. Additionally or alternatively, the method 700 is implemented using a communication module like the communication module 300 of FIG. 3, in some embodiments. FIG. 7 is described with reference to FIGS. 1 and 3 for ease of explanation. In other embodiments, the method 700 is implemented in another suitable vehicle different than the vehicle 100 of FIG. 1, and/or using another suitable communication module different than the communication module 300 of FIG. 3.

At block 704, the communication module (e.g., the communication module 300) receives an Ethernet packet via a first network interface coupled to a first communication link (e.g., a first communication link 124).

At block 708, the communication module (e.g., the communication module 300) determines whether the Ethernet packet received at block 704 is a duplicate of another Ethernet packet that was previously received via a second network interface coupled to a second communication link (e.g., a second communication link 124). For example, the communication module (e.g., the processor 312) stores (in a memory device of the communication module 300) identification information from Ethernet packets previously received during a time window; the communication module (e.g., the processor 312) compares identification information in the Ethernet packet received at block 704 to the identification information (corresponding to Ethernet packets previously received during a time window) stored in the memory. If the identification information in the Ethernet packet received at block 704 matches any identification information stored in the memory, the communication module (e.g., the processor 312) determines that the Ethernet packet received at block 704 is a duplicate of an Ethernet packet that was previously received via another network interface of the communication module. On the other hand, if the identification information in the Ethernet packet received at block 704 does not match any identification information stored in the memory, the communication module (e.g., the processor 312) determines that the Ethernet packet received at block 704 is not a duplicate of an Ethernet packet that was previously received via another network interface of the communication module.

Examples of identification information in Ethernet packets include i) a sequence number (e.g, in a TCP header, in a proprietary header, etc.) within a payload of the Ethernet packet, ii) a sequence number/Ethernet source address pair, iii) a sequence number/Ethernet source address/Ethernet destination address tuple, and the second communication module (e.g., the processor 312) uses the sequence number/Ethernet source address/Ethernet destination address tuple to determine that the multiple instances of the Ethernet packet are duplicates of the same Ethernet packet, in another embodiment. In other embodiments, the second communication module determines that the multiple instances of the Ethernet packet are duplicates of the same Ethernet packet using other suitable information the multiple instances of the Ethernet packet.

When the communication module (e.g., the communication module 300) determines at block 708 that the Ethernet packet received at block 704 is not a duplicate of a previously received Ethernet packet, the flow proceeds to block 712. At block 712, the communication module processes the Ethernet packet. In an embodiment, processing the Ethernet packet comprises providing packet data in the Ethernet packet to another component of the zone On the other hand, when the communication module (e.g., the communication module 300) determines at block 708 that the Ethernet packet received at block 704 is a duplicate of a previously received Ethernet packet, the flow proceeds to block 716. At block 716, the communication module (e.g., the communication module 300) drops the packet. For example, the processor 312 drops the packet, in an embodiment.

Figure 8:
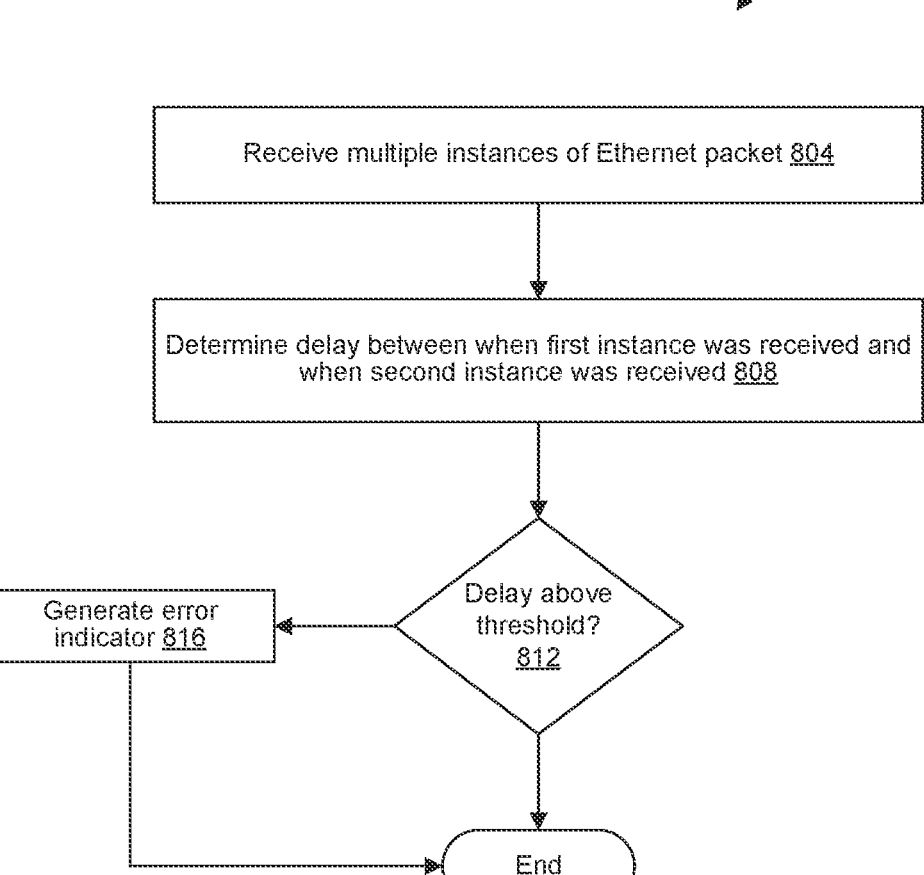
FIG. 8 is a flow diagram of another example method for processing received packets in an in-vehicle network that provides redundant communications, according to another embodiment.

FIG. 8 is a flow diagram of an example method 800 for processing received packets in an in-vehicle network that provides redundant communications, according to an embodiment. The method 800 is implemented in the network of the vehicle 100 of FIG. 1, according to an embodiment. Additionally or alternatively, the method 800 is implemented using a communication module like the communication module 300 of FIG. 3, in some embodiments. FIG. 8 is described with reference to FIGS. 1 and 3 for ease of explanation. In other embodiments, the method 800 is implemented in another suitable vehicle different than the vehicle 100 of FIG. 1, and/or using another suitable communication module different than the communication module 300 of FIG. 3.

At block 804, a communication module (e.g., the communication module 300) receives multiple instances of a same Ethernet packet to from respective Ethernet switches (e.g., the Ethernet switches 116) via respective communication links (e.g., respective communication links 124). For example, respective network interfaces of the communication module receive respective instances of the Ethernet packet. As another example, respective PHY processors 304 receive respective instances of the Ethernet packet. As another example, respective MAC processors 308 receive respective instances of the Ethernet packet. As another example, the processor 312 receives multiple instances of the Ethernet packet from respective network interfaces (e g., from respective MAC processors 308 of the respective network interfaces).

At block 808, the communication module determines a delay between i) when a first instance of the Ethernet packet was received via a first communication link, and ii) when a second instance of the Ethernet packet was received via a second communication link. For example, first timestamping circuitry 318-1 in a first network interface generates a first timestamp that indicates a first time when the first instance of the Ethernet packet was received by the first network interface, and second timestamping circuitry 318-2 in a second network interface generates a second timestamp that indicates a second time when the second instance of the Ethernet packet was received by the second network interface, in an embodiment. As another example, first timestamping circuitry 318-1 in the PHY processor 304-1 generates a first timestamp that indicates a first time when the first instance of the Ethernet packet was received by the PHY processor 304-1, and second timestamping circuitry 318-2 in the PHY processor 304-2 generates a second timestamp that indicates a second time when the second instance of the Ethernet packet was received by the PHY processor 304-2, in an embodiment. As another example, first timestamping circuitry 318-1 in the MAC processor 308-1 generates a first timestamp that indicates a first time when the first instance of the Ethernet packet was received by the MAC processor 308-1, and second timestamping circuitry 318-2 in the MAC processor 308-2 generates a second timestamp that indicates a second time when the second instance of the Ethernet packet was received by the MAC processor 308-2, in an embodiment. As another example, timestamping circuitry 318 in the processor 312 generates a first timestamp that indicates a first time when the first instance of the Ethernet packet was received by the processor 312, and the timestamping circuitry 318 in the processor 312 generates a second timestamp that indicates a second time when the second instance of the Ethernet packet was received by the processor 312, in an embodiment.

The processor 312 determines a delay by comparing the first timestamp and the second timestamp, according to an embodiment.

At block 812, the communication module determines whether the delay determined at block 808 is above a threshold. For example, the processor 312 determines whether the delay determined at block 808 is above a threshold.

In response to determining at block 812 that the delay is below the threshold, the flow 800 ends. On the other hand, in response to determining at block 812 that the delay is above the threshold, the flow proceeds to block 816. At block 816, the communication module generates an error indicator. For example, if the delay determined at block 808 is above the threshold, this may indicate that the communication module 300, one of the Ethernet switches 116, and/or the in-vehicle network is operating suboptimally, and that maintenance and/or diagnostics is warranted, in some embodiments.

In networks that include more than two Ethernet switches, blocks 808 and 812 are repeated for different pairs of instances of the Ethernet packet, in some embodiments. In other embodiments networks that include more than two Ethernet switches, the delay determined at block 808 is determined with respect to an earliest received instance and a latest received instance of the Ethernet packet.

In some embodiments, the method 800 further includes transmitting, by the communication module, the error indicator to the network controller (e.g., the network controller 140) via one or both of the Ethernet switch planes 112.

In an embodiment, the method 600 additionally or alternatively includes the communication module sending the error indicator to the communication gateway zone 108 via one or both of the Ethernet switch planes 112, and the communication gateway zone 108 transmits the error indicator to a server (e.g., of a manufacturer of the vehicle, a manufacturer of a component of the vehicle, a maintenance and/or repair service provider, etc.) via the transceiver of the communication gateway zone 108. In an embodiment, the communication module additionally or alternatively sends the error indicator via one or both of the Ethernet switch planes 112 to a zone 108 that includes a user display device, and the zone displays the error indicator on the user display device.

Figure 9:
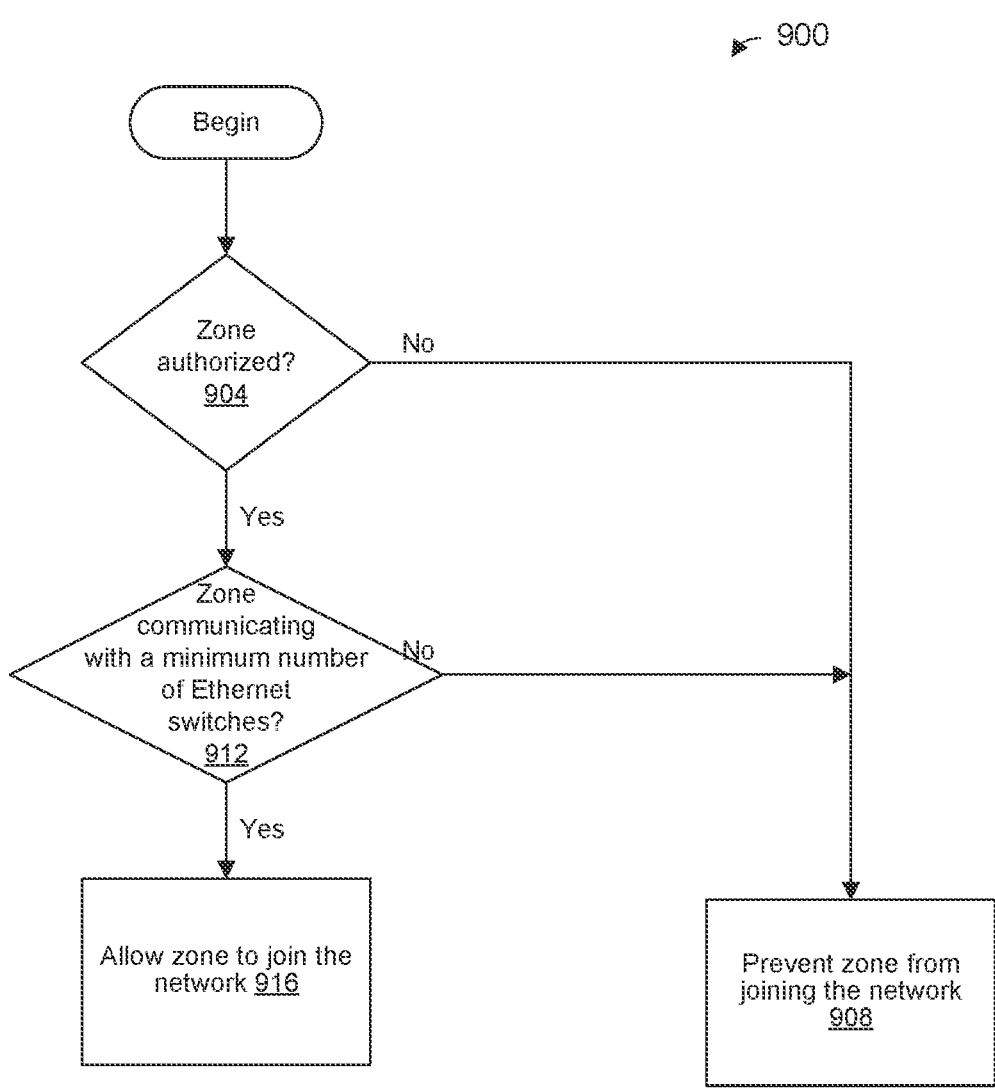
FIG. 9 is a flow diagram of an example method for adding a vehicle subsystem assembly in an in-vehicle network that provides redundant communications, according to an embodiment.

FIG. 9 is a flow diagram of an example method 900 for adding a vehicle subsystem assembly (i.e., a zone) in an in-vehicle network that provides redundant communications, according to an embodiment. The method 900 is implemented in the network of the vehicle 100 of FIG. 1, according to an embodiment. Additionally or alternatively, the method 900 is implemented using an Ethernet switch like the Ethernet switch 200 of FIG. 2 and/or a network controller like the network controller 140 (FIG. 1) and/or the network controller 400 (FIG. 4), in some embodiments. FIG. 9 is described with reference to FIGS. 1, 2, and 4 for ease of explanation. In other embodiments, the method 900 is implemented in another suitable vehicle different than the vehicle 100 of FIG. 1, and/or using another suitable Ethernet switch different than the Ethernet switch 200 of FIG. 2, and/or another suitable network controller different than the network controller 140 and the network controller 400.

The flow 900 begins in response to a zone attempting to join the in-vehicle network, according to an embodiment. The zone attempting to join the in-vehicle network may be in connection with a restart of the vehicle and/or the in-vehicle network, a reset of the in-vehicle network, an installation of a new zone, etc., according to various embodiments At block 904, it is determined whether the zone is authorized to join the network. Determining whether the zone is authorized to join the network comprises determining whether the zone has sent authentication information to one or more of the Ethernet switches 116 that confirms that the zone is authorized to join the network. In various embodiments, the authentication information includes one or more of: i) a secret key known to the Ethernet switches 116 and/or the network controller 140, ii) a globally unique identifier (GUID) that corresponds to the zone (e.g., a globally unique MAC address) and that is known to the Ethernet switches 116 and/or the network controller 140, iii) a vehicle identification number (VIN) corresponding to the vehicle, iv) respective tokens provided to the zone by the Ethernet switches 116, etc.

Determining whether the zone is authorized at block 904 is performed by one or more Ethernet switches 116 and optionally the network controller 140, in some embodiments. For example, one or more of the Ethernet switches 116 prompt the zone to transmit authentication information, and the one or more Ethernet switches 116 receive the authentication information in response to the prompt, in an embodiment. Each of the one or more Ethernet switches 116 uses the authentication information received from the zone to determine whether the zone is authorized, and each of the one or more Ethernet switches 116 informs the network controller 140 whether the Ethernet switch 116 determined that the zone is authorized, according to an embodiment. In another embodiment, each of the one or more Ethernet switches 116 sends the authentication information received from the zone to the network controller 140, and the network controller 140 uses the authentication information to determine whether the zone is authorized; then, the network controller 140 informs each Ethernet switch 116 whether the network controller 140 determined that the zone is authorized.

In an embodiment, each Ethernet switch 116 and/or the network controller 140 maintains a respective database of preapproved authentication information, and each of the one or more Ethernet switches 116 and/or the network controller 140 compares the authentication information received from the zone to the database of preapproved authentication information. In response to determining that the authentication information received from the zone matches information in the database of preapproved authentication information, the Ethernet switch 116 and/or the network controller 140 determines that the zone is authorized, on the other hand, in response to determining that the authentication information received from the zone does not match information in the database of preapproved authentication information, the Ethernet switch 116 and/or the network controller 140 determines that the zone is not authorized, according to an embodiment.

In some embodiments, the database of preapproved authentication information can be updated via a secure communication interface of the vehicle 100 (not shown) by a technician, for example, and/or using a secure communication procedure to add authorization information corresponding to newly approved zones to the database and/or to remove authorization information corresponding to zones that are no longer authorized. In some embodiments, the database of preapproved authentication information additionally or alternatively can be updated by a server communicating with the vehicle 100 via the communication gateway zone 108, for example, using a secure communication procedure to add authorization information corresponding to newly approved zones to the database and/or to remove authorization information corresponding to zones that are no longer authorized.

In response to determining at block 904 that the zone is not authorized, the flow proceeds to block 908. At block 908, the Ethernet switches 116 prevent the zone from joining the network. For example, each Ethernet switch 116 configures itself to ignore at least some packets (e.g., drop the packets, trap the packets, etc.) received from the zone, in an embodiment. For instance, each Ethernet switch 116 configures itself to ignore at least packets received from the zone that are addressed to other zones, in an embodiment. Additionally or alternatively, each Ethernet switch 116 configures itself to prevent other zones from transmitting packets to the zone, in an embodiment. Additionally or alternatively, each Ethernet switch 116 configures a respective port connected to the zone to stop transmission and reception, in an embodiment. Additionally or alternatively, each Ethernet switch 116 prevents an address corresponding to the zone from being added to a respective forwarding table of the Ethernet switch 116, in an embodiment.

In an embodiment, also in response to determining at block 904 that the zone is not authorized, the Ethernet switch(es) 116 and/or the network controller 140 sends a message, which indicates an unauthorized device attempted to access the network, to the communication gateway zone 108 via one or both of the Ethernet switch planes 112, and the communication gateway zone 108 transmits the message to a server (e.g., of a manufacturer of the vehicle, a manufacturer of a component of the vehicle, a maintenance and/or repair service provider, etc.) via the transceiver of the communication gateway zone 108. In an embodiment, the Ethernet switch(es) 116 and/or the network controller 140 additionally or alternatively send the message via one or both of the Ethernet switch planes 112 to a zone 108 that includes a user display device, and the zone displays the message on the user display device.

On the other hand, in response to determining at block 904 that the zone is authorized, the flow proceeds to block 912. At block 912, it is determined whether the zone is communicating with a minimum number of Ethernet switches 116. In an embodiment, the minimum number of Ethernet switches is all of the Ethernet switches 116. Each Ethernet switch 116 is configured to determine whether the zone is communicating with the Ethernet switch 116, and each Ethernet switch 116 is configured to inform the network controller 140 of whether the Ethernet switch 116 is in communication with the zone; and the network controller 140 determines whether the zone is communicating with multiple Ethernet switches 116 (e.g., all of the Ethernet switches 116) based on information received from the Ethernet switches 116, according to an embodiment. In an embodiment, the network controller 140 informs the Ethernet switches 116 of whether the zone is in communication with the minimum number of Ethernet switches.

In an embodiment, determining whether the zone is in communication with an Ethernet switch 116 comprises the Ethernet switch 116 transmitting a prompt message (referred to herein as a "heartbeat request") that prompts the zone to transmit a response message (referred to herein as a "heartbeat response") to the Ethernet switch 116 within a predetermined time period. If the zone transmits the heartbeat response within the time period to the Ethernet switch 116 in response to the heartbeat request, the Ethernet switch 116 determines that the zone is communicating with the Ethernet switch 116. On the other hand, if the zone does not transmit the heartbeat response within the time period to the Ethernet switch 116 in response to the heartbeat request, the Ethernet switch 116 determines that the zone is not communicating with the Ethernet switch 116

In response to determining at block 912 that the zone is not communicating with the minimum number of Ethernet switches 116, the flow proceeds to block 908, at which the Ethernet switches 116 prevent the zone from joining the network. In an embodiment, also in response to determining at block 912 that the zone is not communicating with the minimum number of Ethernet switches 116, the network controller 140 sends an error message, which indicates the zone is not communicating with the minimum number of Ethernet switches 116, to the communication gateway zone 108 via one or both of the Ethernet switch planes 112, and the communication gateway zone 108 transmits the error message to a server (e.g., of a manufacturer of the vehicle, a manufacturer of a component of the vehicle, a maintenance and/or repair service provider, etc.) via the transceiver of the communication gateway zone 108. In an embodiment, the network controller 140 additionally or alternatively sends the message via one or both of the Ethernet switch planes 112 to a zone 108 that includes a user display device, and the zone displays the error message on the user display device.

On the other hand, in response to determining at block 912 that the zone is communicating with the minimum number of Ethernet switches 116, the flow proceeds to block 916. At block 916, the Ethernet switches 116 permit the zone to join the network. For example, each Ethernet switch 116 configures itself to forward packets received from the zone to other zones, in an embodiment. Additionally, each Ethernet switch 116 configures itself to permit other zones to transmit packets to the zone, in an embodiment. Additionally, each Ethernet switch 116 adds an address corresponding to the zone to a respective forwarding table of the Ethernet switch 116, in an embodiment.

In some embodiments, when one or more Ethernet switches 116 determine that the zone is authorized but one or more other Ethernet switches 116 determine that the zone is not authorized, the flow 900 proceeds to block 908 at which the Ethernet switches 116 prevent the zone from joining the network. In other embodiments, when one or more Ethernet switches 116 determine that the zone is authorized but a remaining one or more other Ethernet switches 116 do not indicate whether the zone is authorized (e.g., because the zone is not communicating with the one or more other Ethernet switches 116), the flow 900 proceeds to block 912. In some such embodiments, the network controller 140 generates an error message, which indicates that one or more Ethernet switches 116 determine that the zone is authorized but a remaining one or more other Ethernet switches 116 do not indicate whether the zone is authorized, and sends the error message to the communication gateway zone 108 via one or both of the Ethernet switch planes 112. The communication gateway zone 108 then transmits the error message to a server (e.g., of a manufacturer of the vehicle, a manufacturer of a component of the vehicle, a maintenance and/or repair service provider, etc.) via the transceiver of the communication gateway zone 108. In an embodiment, the network controller 140 additionally or alternatively sends the error message via one or both of the Ethernet switch planes 112 to a zone 108 that includes a user display device, and the zone displays the error message on the user display device.

In other embodiments, when the network controller 140 determines that the zone is communicating with at least one Ethernet switch 116 but is not communicating with the minimum number of Ethernet switches 116, the network controller 140 permits the zone to join the network. In some such embodiments, the network controller 140 generates an error message, which indicates that the zone is not communicating with the minimum number of Ethernet switches 116, and sends the error message to the communication gateway zone 108 via one or both of the Ethernet switch planes 112. The communication gateway zone 108 then transmits the error message to a server (e.g, of a manufacturer of the vehicle, a manufacturer of a component of the vehicle, a maintenance and/or repair service provider, etc.) via the transceiver of the communication gateway zone 108. In an embodiment, the network controller 140 additionally or alternatively sends the error message via one or both of the Ethernet switch planes 112 to a zone 108 that includes a user display device, and the zone displays the error message on the user display device.

Figure 10:
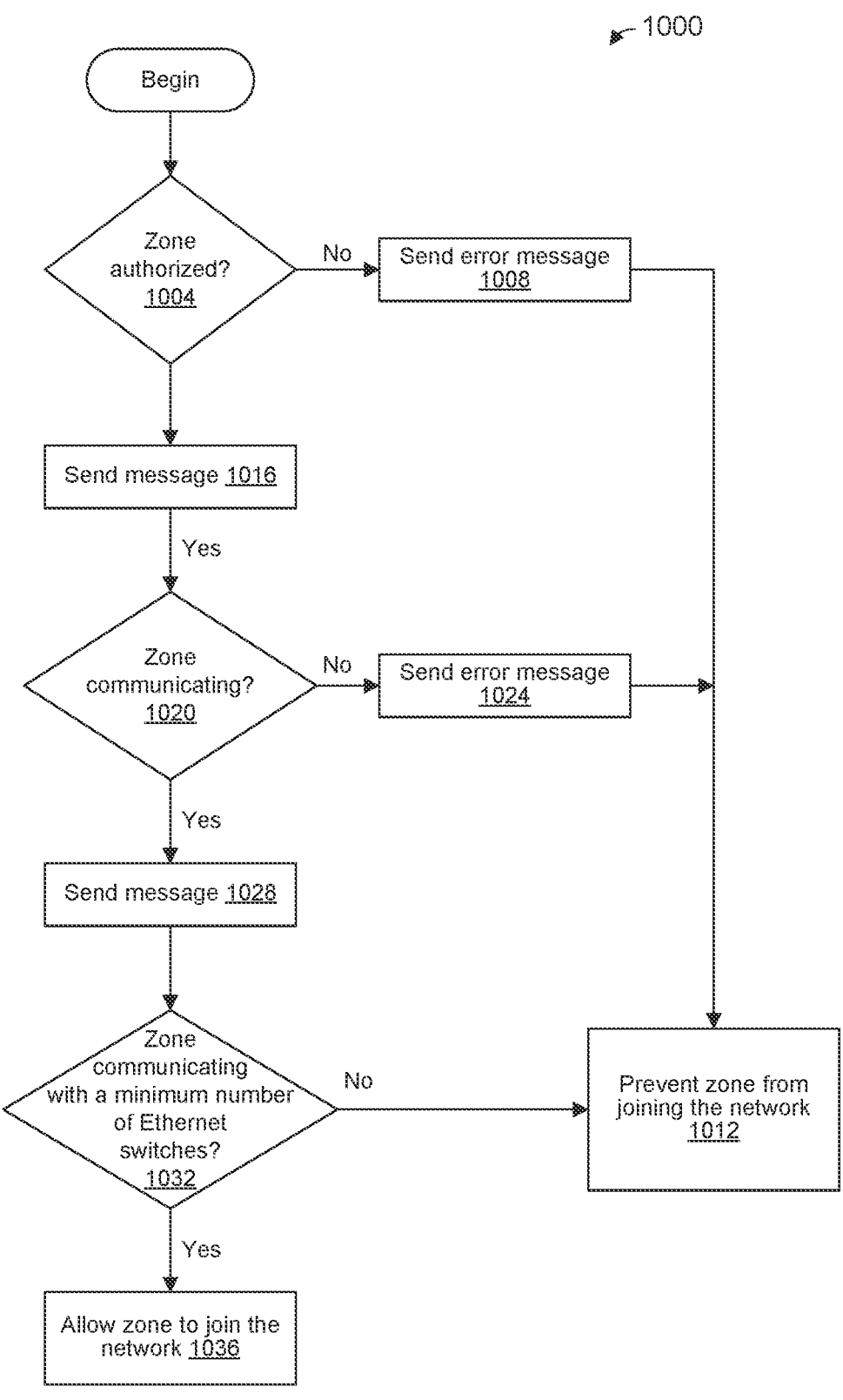
FIG. 10 is a flow diagram of another example method for adding a vehicle subsystem assembly in an in-vehicle network that provides redundant communications, according to another embodiment.

FIG. 10 is a flow diagram of an example method 1000 for adding a vehicle subsystem assembly (i.e., a zone) in an in-vehicle network that provides redundant communications, according to another embodiment. The method 1000 is implemented in the network of the vehicle 100 of FIG. 1, according to an embodiment. Additionally or alternatively, the method 1000 is implemented using an Ethernet switch like the Ethernet switch 200 of FIG. 2, in some embodiments. FIG. 10 is described with reference to FIGS. 1 and 2 for ease of explanation. In other embodiments, the method 1000 is implemented in another suitable vehicle different than the vehicle 100 of FIG. 1, and/or using another suitable Ethernet switch different than the Ethernet switch 200 of FIG. 2.

The flow 1000 begins in response to a zone attempting to join the in-vehicle network, according to an embodiment. The zone attempting to join the in-vehicle network may be in connection with a restart of the vehicle and/or the in-vehicle network, a reset of the in-vehicle network, an installation of a new zone, etc., according to various embodiments.

At block 1004, the Ethernet switch determines whether the zone is authorized to join the network. Determining whether the zone is authorized to join the network comprises determining whether the zone has sent authentication information to one or more of the Ethernet switches 116 that confirms that the zone is authorized to join the network. In various embodiments, the authentication information includes one or more of: i) a secret key known to the Ethernet switches 116 and/or the network controller 140, ii) a GUID (e.g., a globally unique MAC address) that corresponds to the zone and that is known to the Ethernet switches 116 and/or the network controller 140, iii) a VIN corresponding to the vehicle, iv) respective tokens provided to the zone by the Ethernet switches 116, etc.

In an embodiment, the Ethernet switch 116 prompts the zone to transmit authentication information, and the Ethernet switch 116 receives the authentication information in response to the prompt, in an embodiment. The Ethernet switch 116 uses the authentication information received from the zone to determine whether the zone is authorized. In an embodiment, the Ethernet switch 116 maintains a database of preapproved authentication information, and the Ethernet switch 116 and compares the authentication information received from the zone to the database of preapproved authentication information. In response to determining that the authentication information received from the zone matches information in the database of preapproved authentication information, the Ethernet switch 116 determines that the zone is authorized; on the other hand, in response to determining that the authentication information received from the zone does not match information in the database of preapproved authentication information, the Ethernet switch 116 determines that the zone is not authorized, according to an embodiment.

In another embodiment, the Ethernet switch 116 sends the authentication information received from the zone to the network controller 140, and the network controller 140 uses the authentication information to determine whether the zone is authorized; then, the network controller 140 informs the Ethernet switch 116 whether the network controller 140 determined that the zone is authorized In response to determining at block 1004 that the zone is not authorized, the flow proceeds to block 1008. At block 1008, the Ethernet switch 116 sends a message to the network controller 140 informing the network controller 140 that a new zone is attempting to join the network and that the new zone is not authorized. Then, the flow proceeds to block 1012.

At block 1012, the Ethernet switch 116 prevents the zone from joining the network. For example, each Ethernet switch 116 configures itself to ignore at least some packets (e.g., drop the packets, trap the packets, etc.) received from the zone, in an embodiment. For instance, the Ethernet switch 116 configures itself to ignore at least packets received from the zone that are addressed to other zones, in an embodiment. Additionally or alternatively, the Ethernet switch 116 configures itself to prevent other zones from transmitting packets to the zone, in an embodiment. Additionally or alternatively, the Ethernet switch 116 configures a port connected to the zone to stop transmission and reception, in an embodiment. Additionally or alternatively, the Ethernet switch 116 prevents an address corresponding to the zone from being added to a forwarding table of the Ethernet switch 116, in an embodiment.

On the other hand, in response to determining at block 1004 that the zone is authorized, the flow proceeds to block 1016. At block 1016, the Ethernet switch 116 sends a message to the network controller 140 informing the network controller 140 that a new zone is attempting to join the network and that the new zone is authorized. Then, the flow proceeds to block 1020.

In some embodiments in which the network controller 140 informs the Ethernet switch whether the zone is authorized, one or both of the blocks 1008 and 1016 are omitted.

At block 1020, it is determined whether the zone is communicating with the Ethernet switch 116. In an embodiment, determining whether the zone is in communication with the Ethernet switch 116 comprises the Ethernet switch 116 transmitting a heartbeat request that prompts the zone to transmit a heartbeat response to the Ethernet switch 116 within a predetermined time period. If the zone transmits the heartbeat response within the time period to the Ethernet switch 116 in response to the heartbeat request, the Ethernet switch 116 determines that the zone is communicating with the Ethernet switch 116. On the other hand, if the zone does not transmit the heartbeat response within the time period to the Ethernet switch 116 in response to the heartbeat request, the Ethernet switch 116 determines that the zone is not communicating with the Ethernet switch 116.

In response to determining at block 1020 that the zone is not communicating with the Ethernet switch 116, the flow proceeds to block 1024, at which the Ethernet switch 116 sends a message to the network controller 140 to inform the network controller 140 that the zone is not communicating with the Ethernet switch 116. Then, the flow proceeds to block 1012, at which the Ethernet switch 116 prevents the zone from joining the network.

On the other hand, in response to determining at block 1020 that the zone is communicating with the Ethernet switch 116, the flow proceeds to block 1028. At block 1028, the Ethernet switch 116 sends a message to the network controller 140 informing the network controller 140 that the new zone is communicating with the Ethernet switch 116. Then, the flow proceeds to block 1032.

At block 1032, the Ethernet switch 116 determines whether the zone is communicating with the minimum number of Ethernet switches 116. In an embodiment, the network controller 140 determines whether the zone is communicating with the minimum number of Ethernet switches 116 (e.g., all of the Ethernet switches 116) based on information received from the Ethernet switches 116, and the network controller 140 informs the Ethernet switch 116 of whether the zone is in communication with the minimum number of Ethernet switches.

In response to determining at block 1032 that the zone is not communicating with the minimum number of Ethernet switches 116, the flow proceeds to block 1012, at which the Ethernet switch 116 prevents the zone from joining the network.

On the other hand, in response to determining at block 1032 that the zone is communicating with the minimum number of Ethernet switches 116, the flow proceeds to block 1036. At block 1036, the Ethernet switch 116 permits the zone to join the network. For example, the Ethernet switch 116 configures itself to forward packets received from the zone to other zones, in an embodiment. Additionally, the Ethernet switch 116 configures itself to permit other zones to transmit packets to the zone, in an embodiment. Additionally, the Ethernet switch 116 adds an address corresponding to the zone to a forwarding table of the Ethernet switch 116, in an embodiment.

In other embodiments, when the Ethernet switch 116 determines that the zone is communicating with at least the Ethernet switch 116 but is not communicating with the minimum number of Ethernet switches 116, the Ethernet switch 116 permits the zone to join the network. In some such embodiments, the network controller 140 generates an error message, which indicates that the zone is not communicating with the minimum number of Ethernet switches 116, and sends the error message to the communication gateway zone 108 via one or both of the Ethernet switch planes 112. The communication gateway zone 108 then transmits the error message to a server (e.g., of a manufacturer of the vehicle, a manufacturer of a component of the vehicle, a maintenance and/or repair service provider, etc.) via the transceiver of the communication gateway zone 108.

In an embodiment, the network controller 140 additionally or alternatively sends the error message via one or both of the Ethernet switch planes 112 to a zone 108 that includes a user display device, and the zone displays the error message on the user display device.

Figure 11:
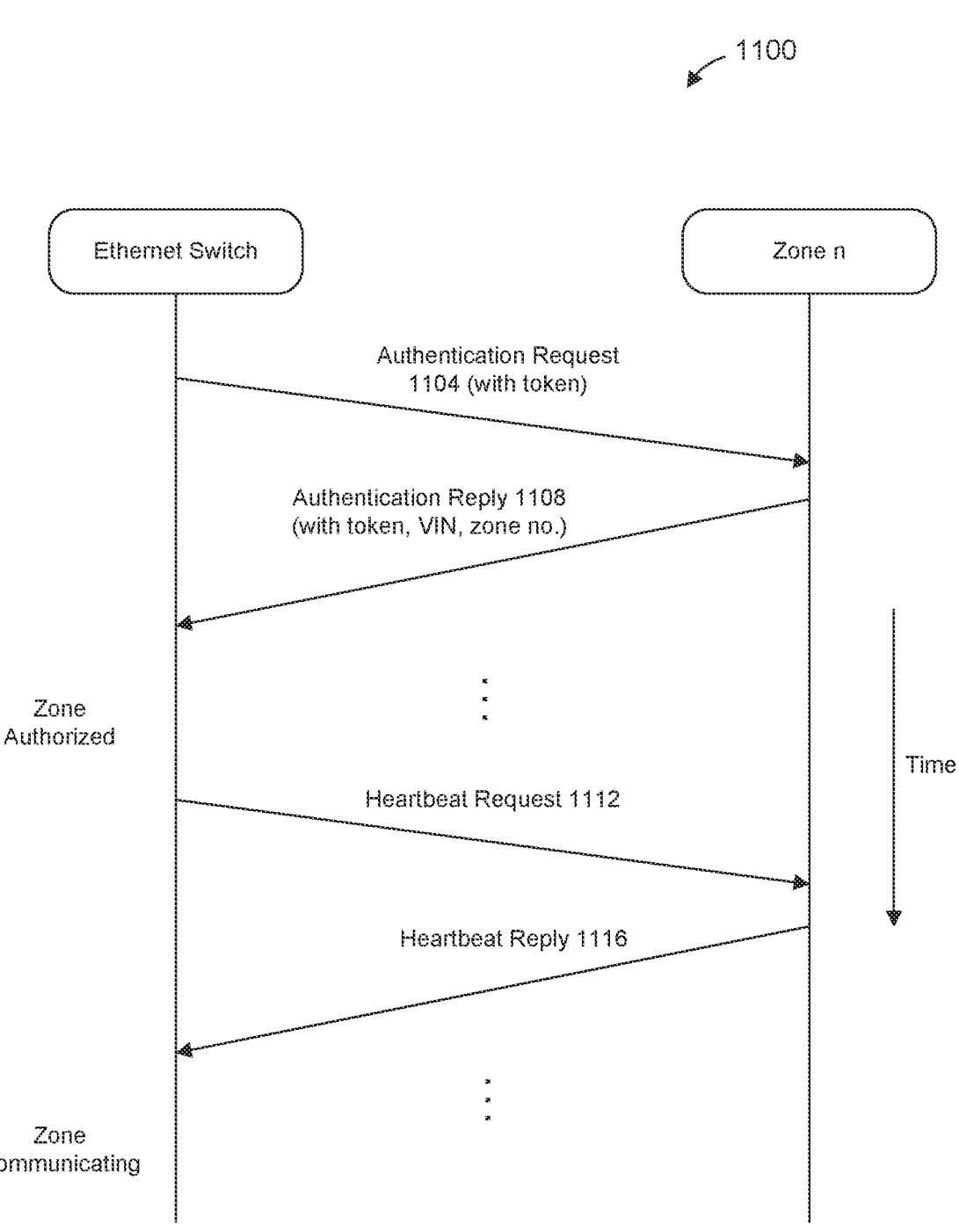
FIG. 11 is a signal flow diagram of an example message exchange between an Ethernet switch and a vehicle subsystem assembly seeking to join an in-vehicle network that provides redundant communications, according to an embodiment.

FIG. 11 is a signal flow diagram of an example message exchange 1100 between an Ethernet switch and a zone seeking to join an in-vehicle network that provides redundant communications, according to an embodiment. The message exchange 1100 is implemented in the network of the vehicle 100 of FIG. 1, according to an embodiment. Additionally or alternatively, the message exchange 1100 is implemented using an Ethernet switch like the Ethernet switch 200 of FIG. 2 and/or using a communication module like the communication module 300 of FIG. 3, in some embodiments. FIG. 11 is described with reference to FIG. 1 for ease of explanation. In other embodiments, the message exchange 1100 is implemented in another suitable vehicle different than the vehicle 100 of FIG. 1, and/or using another suitable Ethernet switch different than the Ethernet switch 200 of FIG. 2, and/or using another suitable communication module different than the communication module 300 of FIG. 3.

The message exchange 1100 is initiated in response to a zone attempting to join the in-vehicle network, according to an embodiment. The zone attempting to join the in-vehicle network may be in connection with a restart of the vehicle and/or the in-vehicle network, a reset of the in-vehicle network, an installation of a new zone, etc., according to various embodiments.

The Ethernet switch 116 transmits an authentication request message 1104 to the zone. The authentication request message 1104 is configured to prompt the zone to provide authentication information such as described above. The authentication request message 1104 includes a token, in an embodiment.

The zone receives the authentication request message 1104 and, in response, transmits an authentication response message 1108 to the zone. The authentication response message 1108 includes authentication information such as described above, in various embodiments. In an illustrative embodiment, the authentication response message 1108 includes authentication information having a VIN and a zone number. The zone number is a unique identifier of a zone in the vehicle 100. In an embodiment, the authentication response message 110 also includes the token from the authentication request message 1104, in an embodiment.

The Ethernet switch 116 uses the information in the authentication response message 1108 to determine, using a suitable technique such as described above, whether the zone is authorized. In the example of FIG. 11, the Ethernet switch 116 determines that the zone is authorized.

Subsequent to determining that the zone is authorized, the Ethernet switch 116 transmits a heartbeat request message 1112 to the zone. The heartbeat request message 1112 is configured to prompt the zone to transmit a heartbeat reply message within a predetermined time period. In response to receiving the heartbeat request message 1112 within the time period, the zone transmits a heartbeat reply message 1116. The Ethernet switch 116 uses the heartbeat request message 1112/heartbeat reply message 1116 message exchange to determine that the zone is in communication with the Ethernet switch 116.

In some embodiments, each Ethernet switch 116 is configured to periodically perform a heartbeat request/heartbeat response message exchange with each of at least some of the zones. When a zone does not reply with a heartbeat response message within the time period, the Ethernet switch 116 sends an error message, e.g., to the network controller 140 via one or both of the Ethernet switch planes 112, to indicate a possible problem with the zone, in an embodiment. When multiple zones do not reply to the Ethernet switch 116 with heartbeat response messages within the time period, the Ethernet switch 116 sends an error message, e.g., to the network controller 140 via one or both of the Ethernet switch planes 112, to indicate a possible problem with the Ethernet switch plane.

In an embodiment, the Ethernet switch 116 and/or the network controller 140 send the error message to the communication gateway zone 108 via one or both of the Ethernet switch planes 112, and the communication gateway zone 108 transmits the error message to a server (e.g., of a manufacturer of the vehicle, a manufacturer of a component of the vehicle, a maintenance and/or repair service provider, etc.) via the transceiver of the communication gateway zone 108. In an embodiment, the Ethernet switch 116 and/or the network controller 140 additionally or alternatively send the error message via one or both of the Ethernet switch planes 112 to a zone 108 that includes a user display device, and the zone displays the error indicator on the user display device.

In an embodiment, when the network controller 140 i) receives an error message indicating that a zone 108 is not responding to one Ethernet switch 116 and ii) determines that the zone is responding to another Ethernet switch 116, the network controller 140 generates an error message that indicates i) the zone 108 is not responding to one Ethernet switch 116 but ii) is responding to another Ethernet switch 116. The sends network controller 140 the error message to the communication gateway zone 108 via one or both of the Ethernet switch planes 112, and the communication gateway zone 108 transmits the error message to a server (e.g, of a manufacturer of the vehicle, a manufacturer of a component of the vehicle, a maintenance and/or repair service provider, etc.) via the transceiver of the communication gateway zone 108 In an embodiment, the Ethernet switch 116 and/or the network controller 140 additionally or alternatively sends the error message via one or both of the Ethernet switch planes 112 to a zone 108 that includes a user display device, and the zone displays the error indicator on the user display device.

Figure 12:
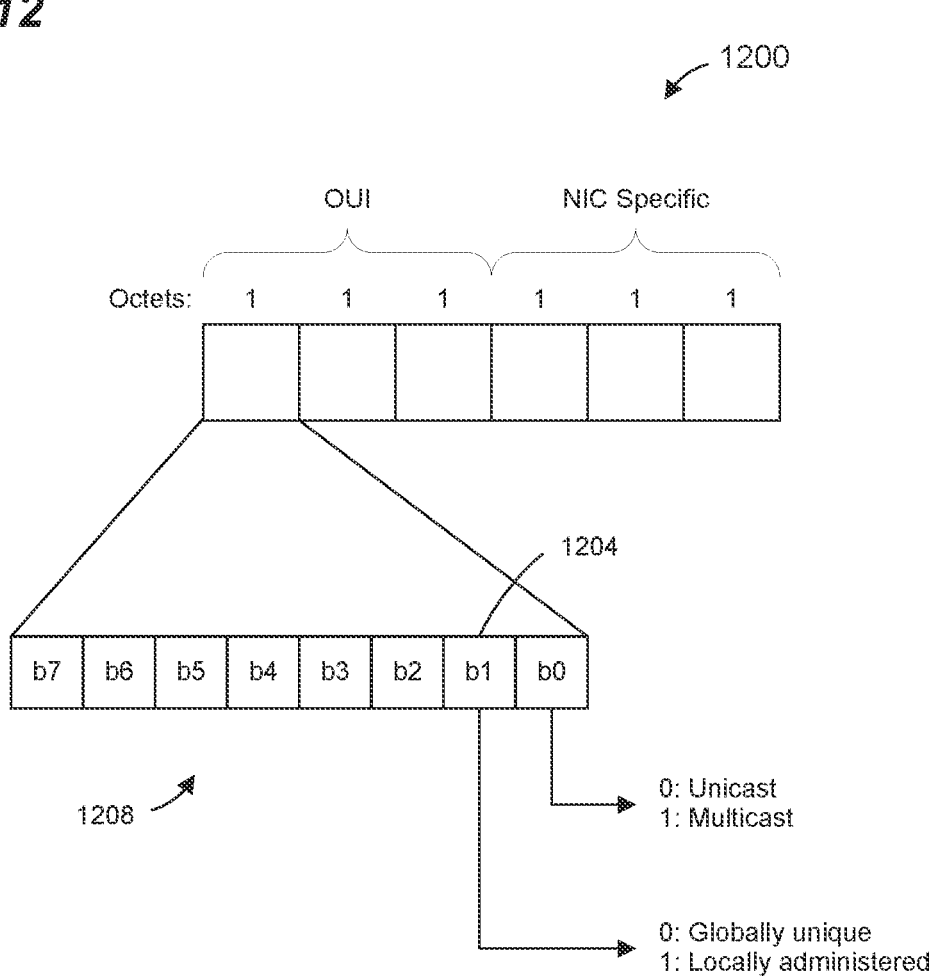
FIG. 12 is a diagram of a media access control (MAC) address that is used by devices of an in-vehicle network, according to some embodiments.

In some embodiments, devices in the in-vehicle network are configured to use locally administered MAC addresses. The locally administered MAC addresses correspond to respective identifiers (IDs) of the zones, i.e., zone IDs, in some embodiments. FIG. 12 is a diagram of a MAC address 1200 that is used by zones of the network, according to some embodiments. A second-least-significant bit 1204 of a first octet 1208 of the MAC address 1200 is set to one to indicate that MAC address 1200 is a locally administered address.

Use of locally administered addresses improves security of the network, in some embodiments. For example, the Ethernet switches 116 are configured to recognize only pre-authorized locally administered addresses. Thus, if a device with a universally administered address (i.e., an address with the bit 1204 set to zero) attempts to join the network, the Ethernet switches 116 will prevent the device from joining the network.

Referring again to FIG. 11, the zone number in the authentication reply message 1108 is a locally administered MAC address, according to an embodiment.

In some embodiments, devices in the network use the Institute of Electrical and Electronics Engineers (IEEE) 802.1AE Standard (sometimes referred to as "MACsec") for improved network security.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts such as described above.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A vehicular communication system, comprising:
a plurality of vehicle subsystem assemblies, each vehicle subsystem assembly configured to perform respective functions for the vehicle, and each vehicle subsystem assembly including at least i) a first Ethernet network interface, and ii) a second Ethernet network interface;
a first Ethernet switch communicatively coupled to the first Ethernet network interfaces of the plurality of vehicle subsystem assemblies, the first Ethernet switch configured to provide a first Ethernet network that includes the plurality of vehicle subsystem assemblies;
a second Ethernet switch communicatively coupled to the second Ethernet network interfaces of the plurality of vehicle subsystem assemblies, the second Ethernet switch configured to provide a second Ethernet network that includes the plurality of vehicle subsystem assemblies, the second Ethernet network providing network redundancy regarding the first Ethernet network; and
a network controller configured to, for each vehicle subsystem assembly:
determine whether the vehicle subsystem assembly is authorized to be included in the vehicular communication system, wherein determining whether the vehicle subsystem assembly is authorized to be included in the vehicular communication system includes determining whether a media access control (MAC) address of the vehicle subsystem assembly is a locally administered address that is authorized for the vehicular communication system, and
in response to determining that the vehicle subsystem assembly is not authorized to be included in the vehicular communication system, control the first Ethernet switch and the second Ethernet switch to block Ethernet traffic corresponding to the vehicle subsystem assembly that is not authorized to be included in the vehicular communication system.

2. The vehicular communication system of claim 1, wherein the network controller is configured to determine whether the vehicle subsystem assembly is authorized to be included in the vehicular communication system at least by determining whether the vehicle subsystem assembly belongs to a set of preapproved vehicle subsystem assemblies.

3. The vehicular communication system of claim 1, wherein, for each vehicle subsystem assembly:

the first Ethernet switch is configured to i) determine whether the vehicle subsystem assembly is communicatively coupled to the first Ethernet switch, and ii) in response to determining that the vehicle subsystem assembly is not communicatively coupled to the first Ethernet switch, generate a first error message; and
the second Ethernet switch is configured to i) determine whether the vehicle subsystem assembly is communicatively coupled to the second Ethernet switch, and ii) in response to determining that the vehicle subsystem assembly is not communicatively coupled to the second Ethernet switch, generate a second error message.

4. The vehicular communication system of claim 3, wherein the network controller is further configured to, in response to determining, based on the first error message and the second error message, that the vehicle subsystem assembly is not communicatively coupled to both of the first Ethernet switch and the second Ethernet switch:
generate a third error message that indicates the vehicle subsystem assembly is not communicatively coupled to both the first Ethernet switch and the second Ethernet switch.

5. The vehicular communication system of claim 3, wherein the network controller is further configured to, in response to determining, based on the first error signal and the second error signal, that the vehicle subsystem assembly is not communicatively coupled to both of the first Ethernet switch and the second Ethernet switch:
at least if one of the first Ethernet switch and the second Ethernet switch remains communicatively coupled to the vehicle subsystem assembly, control at least the one of the first Ethernet switch and the second Ethernet switch to block Ethernet traffic corresponding to the vehicle subsystem assembly.

6. The vehicular communication system of claim 1, wherein each of one or more of the vehicle subsystem assemblies includes:
a communication module that is configured to generate a plurality of instances of a same packet and to control the first Ethernet network interface, and the second Ethernet network interface to transmit respective instances of the packet.

7. The vehicular communication system of claim 6, wherein the communication module is configured to:
measure a time difference between when the first Ethernet network interface transmits a first instance of the packet and when the second Ethernet network interface transmits a second instance of the packet; and
determine whether the time difference exceeds a threshold.

8. The vehicular communication system of claim 1, wherein each of one or more of the vehicle subsystem assemblies includes a communication module that is configured to:
receive respective instances of a same packet from another vehicle subsystem assembly, including receiving a first instance of the packet via the first Ethernet network interface and receiving a second instance of the packet via the second Ethernet network interface;
determine that the multiple instances of the packet are duplicates;
select one of the multiple instances of the packet to process; and
discard one or more remaining instances of the packet.

9. The vehicular communication system of claim 8, wherein the communication module is configured to:

measure a time difference between when the first Ethernet network interface receives the first instance of the packet and when the second Ethernet network interface receives the second instance of the packet; and determine whether the time difference exceeds a threshold.

10. The vehicular communication system of claim 1, wherein the first Ethernet switch includes the network controller.

11. A method for communicating in a vehicular communication system that includes i) a plurality of vehicle subsystem assemblies, ii) a first Ethernet switch communicatively coupled to respective first Ethernet network interfaces of the plurality of vehicle subsystem assemblies, iii) a second Ethernet switch communicatively coupled to respective second Ethernet network interfaces of the plurality of vehicle subsystem assemblies, and iv) a network controller, the method comprising:

for each vehicle subsystem assembly, determine, by the network controller, whether the vehicle subsystem assembly is authorized to be included in the vehicular communication system wherein determining whether the vehicle subsystem assembly is authorized to be included in the vehicular communication system includes determining whether a media access control (MAC) address of the vehicle subsystem assembly is a locally administered address that is authorized for the vehicular communication system;

for each vehicle subsystem assembly, in response to determining that the vehicle subsystem assembly is not authorized to be included in the vehicular communication system, controlling, by the network controller, the first Ethernet switch and the second Ethernet switch to block Ethernet traffic corresponding to the vehicle subsystem assembly that is not authorized to be included in the vehicular communication system;

for each vehicle subsystem assembly, in response to determining that the vehicle subsystem assembly is authorized to be included in the vehicular communication system, controlling, by the network controller, the first Ethernet switch and the second Ethernet switch to permit Ethernet traffic corresponding to the vehicle subsystem assembly is authorized to be included in the vehicular communication system;

providing, by the first Ethernet switch, a first Ethernet network that includes a plurality of vehicle subsystem assemblies that are authorized to be included in the vehicular communication system; and providing, by the second Ethernet switch, a second Ethernet network that includes the plurality of vehicle subsystem assemblies that are authorized to be included in the vehicular communication system.

12. The method of claim 11, wherein determining whether the vehicle subsystem assembly is authorized to be included in the vehicular communication system comprises determining whether the vehicle subsystem assembly belongs to a set of preapproved vehicle subsystem assemblies.

13. The method of claim 11, further comprising, for each vehicle subsystem assemblies that is authorized to be included in the vehicular communication system:

determining, at the first Ethernet switch, whether the vehicle subsystem assembly is communicatively coupled to the first Ethernet switch;

in response to determining that the vehicle subsystem assembly is not communicatively coupled to the first Ethernet switch, generating, by the first Ethernet switch, a first error message; and determining, at the second Ethernet switch, whether the vehicle subsystem assembly is communicatively coupled to the second Ethernet switch; and in response to determining that the vehicle subsystem assembly is not communicatively coupled to the second Ethernet switch, generating, by the second Ethernet switch, a second error message.

14. The method of claim 13, further comprising:

determining at the network controller, based on the first error message and the second error message, that the vehicle subsystem assembly is not communicatively coupled to both of the first Ethernet switch and the second Ethernet switch; and in response to determining that the vehicle subsystem assembly is not communicatively coupled to both of the first Ethernet switch and the second Ethernet switch, generate, at the network controller, a third error message that indicates the vehicle subsystem assembly is not communicatively coupled to both the first Ethernet switch and the second Ethernet switch.

15. The method of claim 13, further comprising:

determining at the network controller, based on the first error message and the second error message, that the vehicle subsystem assembly is not communicatively coupled to both of the first Ethernet switch and the second Ethernet switch; and in response to determining that the vehicle subsystem assembly is not communicatively coupled to both of the first Ethernet switch and the second Ethernet switch, control, by the network controller, at least the one of the first Ethernet switch and the second Ethernet switch to block Ethernet traffic corresponding to the vehicle subsystem assembly.

16. The method of claim 11, further comprising:

generating, at a communication module of one of the vehicle subsystem assemblies, a plurality of instances of a same packet; and transmitting, by the first Ethernet network interface of the one vehicle subsystem assembly and the second Ethernet network interface of the one vehicle subsystem assembly, respective instances of the packet.

17. The method of claim 16, further comprising:

measuring, at the communication module, a time difference between when the first Ethernet network interface of the one vehicle subsystem assembly transmits a first instance of the packet and when the second Ethernet network interface of the one vehicle subsystem assembly transmits a second instance of the packet; and determining, at the communication module, whether the time difference exceeds a threshold.

18. The method of claim 11, further comprising:

receiving, at a communication module of one of the vehicle subsystem assemblies, receive respective instances of a same packet from another vehicle subsystem assembly, including receiving a first instance of the packet via the first Ethernet network interface of the one vehicle subsystem assembly and receiving a second instance of the packet via the second Ethernet network interface of the one vehicle subsystem assembly;

determining, at the communication module, that the multiple instances of the packet are duplicates;

selecting, at the communication module, one of the multiple instances of the packet to process; and discarding, at the communication module, one or more remaining instances of the packet.

19. The method of claim 18, further comprising:

measuring, at the communication module, a time difference between when the first Ethernet network interface of the one vehicle subsystem assembly receives the first instance of the packet and when the second Ethernet network interface of the one vehicle subsystem assembly receives the second instance of the packet; and determining, at the communication module, whether the time difference exceeds a threshold.

20. The method of claim 19, further comprising:

in response to determining that the time difference exceeds the threshold, generating, by the communication module, an error indicator that indicates maintenance and/or diagnostics is warranted.

\* \* \* \* \*